(12) United States Patent
Shih

(10) Patent No.: US 6,184,171 B1
(45) Date of Patent: Feb. 6, 2001

(54) SUPPORTED BIDENTATE AND TRIDENTATE CATALYST COMPOSITIONS AND OLEFIN POLYMERIZATION USING SAME

(75) Inventor: Keng-Yu Shih, Columbia, MD (US)

(73) Assignee: W.R. Grace & Co. -Conn, New York, NY (US)

(*) Notice: Under 35 U.S.C. 154(b), the term of this patent shall be extended for 0 days.

(21) Appl. No.: 09/166,545

(22) Filed: Oct. 5, 1998

(51) Int. Cl.[7] .................................................. B01J 31/00
(52) U.S. Cl. .................. 502/158; 502/155; 502/162; 502/165; 502/166; 502/167; 502/168; 502/169; 502/171; 502/172
(58) Field of Search ...................... 502/155, 158, 502/162, 165, 166, 167, 168, 169, 171, 172

(56) References Cited

U.S. PATENT DOCUMENTS

| | | | | |
|---|---|---|---|---|
| 4,005,046 | * | 1/1977 | Chandra et al. | 252/428 |
| 4,394,294 | * | 7/1983 | Gryaznov et al. | 252/430 |
| 5,202,398 | * | 4/1993 | Antberg et al. | 502/120 |
| 5,643,847 | * | 7/1997 | Walzer, Jr. | 502/120 |
| 5,801,113 | * | 9/1998 | Jejelowo et al. | 502/152 |
| 5,824,620 | * | 10/1998 | Vega et al. | 502/155 |
| 5,846,895 | * | 12/1998 | Gila et al. | 502/120 |
| 5,885,924 | * | 3/1999 | Ward | 502/402 |
| 5,932,511 | * | 8/1999 | Harmer et al. | 502/159 |
| 5,939,347 | * | 8/1999 | Ward et al. | 502/153 |
| 6,087,293 | * | 7/2000 | Carnahan et al. | 502/158 |

FOREIGN PATENT DOCUMENTS

| | | | |
|---|---|---|---|
| 0 638 363 | * | 2/1995 | (EP). |
| 2 092 017 | * | 8/1982 | (GB). |
| 9311172 | | 11/1992 | (WO). |
| 9604319 | | 7/1995 | (WO). |
| 9623010 | | 1/1996 | (WO). |
| WO 96/23005 | * | 8/1996 | (WO). |
| WO 96/28480 | * | 8/1996 | (WO). |
| 9719959 | | 10/1996 | (WO). |
| 9735892 | | 3/1997 | (WO). |
| 9827124 | | 12/1997 | (WO). |
| 9830610 | | 1/1998 | (WO). |
| 9830612 | | 1/1998 | (WO). |

OTHER PUBLICATIONS

New Pd(II)– and Ni(II)–Based Catalyst for Polymerization of Ethylene and alpha–Olefins; Johnson et al, J. Am. Chem. Soc. 1995, p. 6414–6415.

Move Over Metallocenes, Chemical Week, Apr. 29, 1998, p. 72.

New Catalysts to Polymerize Olefins; C&EN, Apr. 13, 1998, p. 11–12.

Highly Active Iron and Cobalt Catalysts for the Polymerization of Ethylene; Small et al; J. Am. Chem. Soc. 1998, 120, p. 4049–4050.

Novel Olefin Polymerization Catalysts Based on Iron and Cobalt; Britovsek et al, Chem. Commun., 1998, p. 849.

Novel Polymerization Reactions Catalyzed by Homogeneous Pd(II) and Ni(II) alpha–diimino complexes; Cattech, Mar. 1997, p. 65–66.

Copolymerization of Ethylene and Propylene with Functionalized Vinyl Monomers by Palladium(II)–Catalysts; J. Am. Chem. Soc., vol. 118, No. 1, 1996, p. 267–268. L.K. Johnson et al.

New Ni(II) Based Catalysts Active in the Polymerization of Olefins; Longo et al; Macromol. Rapid Commun. 19, 31–34 (1998).

* cited by examiner

Primary Examiner—Mark L. Bell
Assistant Examiner—J. Pasterczyk
(74) Attorney, Agent, or Firm—Robert A. Maggio; Howard J. Troffkin

(57) ABSTRACT

A heterogeneous catalyst composition suitable for olefinic polymerization and to methods of forming polyolefinic products using said composition. The catalyst composition comprises an anionic metalloid silane modified inorganic oxide and the cationic remnant of a transition metal bidentate or tridentate compound represented by the formula:

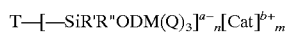

$$T\text{---}[\text{---}SiR'R''ODM(Q)_3]^{a-}{}_n[Cat]^{b+}{}_m$$

wherein each of the symbols above is defined within the subject application.

72 Claims, No Drawings

SUPPORTED BIDENTATE AND TRIDENTATE CATALYST COMPOSITIONS AND OLEFIN POLYMERIZATION USING SAME

BACKGROUND OF THE INVENTION

The present invention relates to catalyst compositions suitable for olefinic polymerization and to methods of forming polyolefinic products using the subject catalyst composition. More particularly, the present invention is directed to heterogeneous catalyst composition comprising a cation component derived from at least one bidentate or tridentate transition metal compound which is activated by an ionic metal or metalloid, silane-modified inorganic oxide support, as fully described herein below. The subject compositions have been found useful in catalyzing olefinic and acetylenic polymerization to provide high molecular weight homopolymers and functionalized copolymers.

Ziegler-Natta and metallocene-alumoxane type catalyst systems are well known in the art as being useful for the polymerization of olefins. Recently, metallocene ionic-pair type of catalyst has been developed which can provide polymer products having improved properties compared to conventional catalyst systems.

Ziegler-Natta type catalysts have long been the conventional system used in olefinic polymerization processes. The transition metal catalyst and the activator (e.g., trialkyl aluminum) may be introduced into the reaction zone on a support. These supports are normally inorganic oxides. Silica, as a support for Ziegler-Natta type catalysts, has been widely used in commercial polyethylene processes, as described in Macromol. Symp., 1995, 89, 563.

Over the past decade, single-site olefin polymerization catalyst systems have been developed. These systems typically use a Group IV-B metallocene compound (compounds having at least one cyclodienyl group coordinated by the pi-bond to a transition metal as, for example cyclopentadienyl and bis(cyclopentadienyl) transition metal compounds) and an ionic activator. U.S. Pat. No. 5,241,025 teaches the use of a catalyst system comprising a Group III-A element compound. This compound has a cation capable of donating a proton which irreversibly reacts with a ligand of the Group IV-B metal compound and an anion which is bulky and non-coordinatable with the Group IV transition metal cation produced upon the reaction of the metallocene and activator compound. Similarly, U.S. Pat. No. 5,198,401 teaches that ionic catalyst compositions can be prepared by combining two components, bis(cyclopentadienyl) Group IV-B metal complex containing at least one ligand which will combine irreversibly with the second component or at least a portion thereof such as a cation portion thereof. The combination of the two components produces an ionic catalyst composition comprising a cationic bis(cyclopentadienyl) Group IV-B metal complex which has a formal coordination number 3 and a 4+ valence charge and the aforementioned non-coordinating anion. Both of the above U.S. Patents are directed to homogeneous metallocene polyolefin catalyst systems. Use of these catalyst systems in slurry reactors, can result in reactor fouling, poor productivities, poor polymer bulk densities, and poor polymer morphologies.

A supported ion pair catalyst system is taught in WO 94/03506. The support, which had been modified with an alkyl aluminum reagent, is treated with a solution of a metallocene catalyst and an anionic activator, and the solvent is removed. The resulting catalyst system provided a heterogeneous ion pair catalyst system of low activity. This system is taught to be useful in slurry reaction processes. Such processes are highly desired as they combine the advantages of homogeneous catalysis and the ease of particle forming associated with slurry and heterogeneous polymerization processes. However, because there is no direct chemical bond between the catalyst ion pair and the support, resolubilization of the catalyst is possible and would cause the system to be unsuitable for slurry reaction processes.

Activators which are widely used are aluminum compounds selected from an alumoxane or an aluminum compound having the formula $AlR_3$ wherein each R is independently selected from a $C_1$–$C_{20}$ hydrocarbyl or $C_1$–$C_{20}$ hydrocarbyloxy group and preferably selected from alumoxanes and tris($C_1$–$C_4$ hydrocarbyl) aluminum compounds. The alumoxanes are most preferred. These compounds are oligimers or polymeric aluminum oxy compounds containing chains of alternating aluminum and oxygen atoms and whereby the aluminum atoms carry a substituent such as an alkyl group. Alumoxanes are normally formed by the reaction of water and an aluminum alkyl, which may, in addition to the alkyl group, contain halide or alkoxide groups, as disclosed in U.S. Pat. No. 4,542,119 and EP-A-338,044. The most preferred alumoxane is methylalumoxane (MAO). Due to the unstable and pyrophoric nature of alumoxanes, one must use a high degree of care in handling systems using these activators.

More recently, several patents (U.S. Pat. Nos. 5,516,737; 5,529,965; 5,595,950; and 5,625,015) disclose the use of silica supported metallocene/aluminum alkyl activated systems for slurry and gas phase heterogeneous olefin polymerization processes. However, these systems, like others which use MAO and the like as activator, have known disadvantages of requiring high molar ratios of aluminum to metallocene in order to achieve a catalyst composition of suitable reactivity, although such systems still produce undesirable low molecular weight polymer product.

WO 93/11172 discloses the use of certain polyanionic transition metal catalyst compositions. The anionic moiety is composed of a plurality of metal or metalloid atom containing non-coordinating anionic groups which are chemically bonded to a core component, such as silica, via a hydrocarbyl moiety. The transition metal catalyst is generally of the metallocene type. This catalyst system has certain disadvantages. Firstly, the anionic metal or metalloid component is taught to be bonded to the support substrate by dehydrohalogenation of a halogen containing metal/metalloid precursor with hydroxyl groups of the support. Small amounts of halogen by-product and/or precursor remain in the product. These materials can poison the catalyst system. Further, the reference teaches that the metalloid precursors, 4, 5 and 6 (See FIG. 1 of WO '172) may be reacted with the hydroxylated substrate, such as silica, alumina or metal oxide to bond the metalloid to the substrate. This produces an equivalence of HCl which may be liberated or produce an ammonium halide which will poison the resultant catalyst system and, thereby, achieves a system of low activity. Still further, the reference teaches that the support should be made substantially free of residual hydroxyl groups which are known to be located on the silica surface. Such groups are also known to reduce the activity of the intended catalyst. Removal of all of the hydroxyl groups is difficult. Still further, WO 93/11172 teaches that one must avoid exposing its catalyst to high concentrations of functional (especially oxygen containing functional) groups as such groups can poison the catalyst system. Finally, the catalyst system taught by WO 93/11172 and WO 97/19959 has low catalytic activity, is sensitive to oxygen and oxygen containing groups and provides polymer products having low polydispersity (narrow molecular weight distribution). Polymer products having these properties are difficult to process (e.g., extrude) by known techniques.

It would be desirable to provide a heterogeneous catalyst composition and a polymerization process capable of producing olefinic polymers at good catalyst efficiencies. It would be further desirable to provide a heterogeneous catalyst composition suitable for use in slurry and heterogeneous gas phase polymerization processes. Still further, it would be desirable to provide a heterogeneous catalyst composition capable of producing olefinic polymers having a sufficiently high polydispersity value, that is, to provide a polymer product of desired broad molecular weight distribution and of high weight average molecular weight. Still further, it would be desirable to provide a heterogeneous catalyst composition which is substantially free of halogen atom containing materials. Finally, it would be desirable to provide a heterogeneous catalyst composition capable of producing olefinic polymers from comonomers, some of which comprise oxygen atom containing functional groups.

SUMMARY OF THE INVENTION

The present invention is directed to a new and novel heterogeneous catalyst composition and to polymerization process utilizing said composition wherein the catalyst composition has been found to achieve the above-described desired characteristics, including those of good catalyst activity capacity to produce olefinic polymers of sufficiently high polydispersity values and high weight average molecular weight to be capable of being readily processed by extrusion techniques and the like, of being substantially free of halogen containing material and of being suitable to produce copolymers having at least some monomeric units having pendant functional groups.

The subject catalyst composition provides a polymerization process which produces desired high weight average molecular weight olefinic polymer product of sufficiently high polydispersity values to be readily processed into films and structures by conventional techniques.

DETAILED DESCRIPTION

The present invention is directed to a new catalyst composition composed of at least one Anion Component and at least one Cation Component.

The term "Cation Component" as used herein and in the claims appended hereto refers to a bidentate or tridentate, transition metal cation. The term "Anion Component" as used herein and in the claims appended hereto refers to an anionic metal or metalloid silane modified inorganic oxide support material which serves to activate the Cationic Component.

The term "substituted" as used herein and in the appended claims, e.g., in connection with hydrocarbyl groups forming a portion of the catalyst composition, refers to the presence of heteroatom containing groups which are inert with respect to the contemplated polymerization using the formed subject catalyst composition and which do not alter the predominately hydrocarbyl character of said hydrocarbyl groups. Such heteroatom containing groups may be (i) a hydrocarbon radical which contains non-hydrocarbon substituent(s) such as, for example, halo, nitro, hydroxy, alkoxy, carbalkoxy alkylthio and the like; or (ii) a hetero radical wherein, while the radical is predominantly hydrocarbon in character, the radical contains atoms other than carbon such as, for example, nitrogen, oxygen and sulfur, in a chain or ring which is otherwise composed of carbon atoms.

The catalyst composition can be readily prepared in high yields and efficiencies. Further, the Anion Component can be formed in a manner which permits the resultant catalyst composition to be substantially free of halogen atom containing molecules capable of inhibiting the catalyst activity of the catalyst system.

All references herein to elements or metals belonging to a certain Group are referenced herein with respect to the Periodic Table of the Elements, as published and copyrighted by CRC Press, Inc. 1989. Also any reference to the Group or Groups shall be as reflected in this Periodic Table of Elements using the IUPAC system for numbering such groups.

The Cation Component described fully herein below are activated to a catalytically active state when in the presence of the subject Anion Component. The Anion Component is derived from a Precursor Ion Pair wherein the anion thereof constitutes a precursor to and is the same as the Anion Component of the catalyst composition and the cation thereof eventually causes the formation of the Cation Component of the catalyst composition. For ease of discussion, the anion of the Precursor Ion Pair is referred to herein as the Precursor Anion, but it is to be understood that the Precursor Anion and the Anion Component of the catalyst composition are the same compositionally. Similarly, the cation of the Precursor Ion Pair is referred to herein as the Precursor Cation. The support comprises inorganic oxide macromolecules which have pendant therefrom a plurality of silane (—SiR$_2$—) bridging groups to which an anionic group is covalently bonded. The Precursor Ion Pair can be represented by the following structural formula:

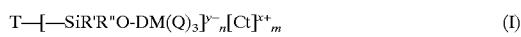

wherein

T represents an inorganic oxide core support such as silica, alumina, preferably a silica macromolecular core, where a portion of the precursor inorganic oxide has hydroxyl groups pendent therefrom;

SiR'R" represents a silane bridging group in which each R' and R" independently is selected from hydrogen, a $C_1$–$C_{20}$ hydrocarbyl, or a $C_1$–$C_{20}$ hydrocarbyloxy group and Si is a silicon atom;

D represents an unsubstituted $C_1$–$C_{20}$, preferably $C_4$ to $C_{20}$, more preferably $C_6$ to $C_{15}$ hydrocarbylene group, or a substituted $C_1$ to $C_{20}$, preferably $C_4$ to $C_{20}$, more preferably $C_6$ to $C_{15}$ hydrocarbylene, including a $C_1$–$C_{20}$, preferably $C_4$ to $C_{20}$, more preferably $C_6$ to $C_{15}$ hydrocarbylenoxy group, a $C_1$–$C_{20}$, preferably $C_4$ to $C_{20}$, more preferably $C_6$ to $C_{15}$ fluorinated hydrocarbylenoxy group or a $C_1$–$C_{20}$, preferably $C_4$ to $C_{20}$, more preferably $C_6$ to $C_{15}$ fluorinated hydrocarbylenoxy group. The above groups can be selected from alkylene, cycloalkylene, arylene, polyarylene, or fused arylene groups which may be unsubstituted or be fluorinated or be substituted by one or more alkyl, alkoxy, or aryl groups. D preferably represents a sterically bulky hydrocarbylene or fluorinated hydrocarbylene group such as a branched alkylene, a cycloalkylene, an arylene (unsubstituted or having one or more alkyl substitution groups), a fluoroarylene group, a polyarylene (unsubstituted or having one or more alkyl substitution groups) or a fused arylene group (unsubstituted or having one or more alkyl substitution groups) or the like. The most preferred D groups are unsubstituted or substituted arylene, polyarylene or fused arylene groups;

M represents an atom of boron, aluminum, gallium, indium or tellurium in its +3 oxidation state and mixtures of the foregoing, preferably bo1ron or aluminum and most preferably boron;

Q each independently represents a $C_1-C_{20}$, preferably $C_4$ to $C_{20}$, more preferably $C_6$ to $C_{15}$, substituted or unsubstituted hydrocarbyl, or a $C_1$ to $C_{20}$, preferably a $C_4$ to $C_{20}$, more preferably a $C_6$ to $C_{15}$ substituted hydrocarbyl, including $C_1-C_{20}$, preferably $C_4$ to $C_{20}$, more preferably $C_6$ to $C_{15}$ hydrocarbyloxy, $C_1-C_{20}$, preferably $C_4$ to $C_{20}$, more preferably $C_6$ to $C_{15}$ fluorinated hydrocarbyl or $C_1-C_{20}$, preferably $C_4$ to $C_{20}$, more preferably $C_6$ to $C_{15}$ fluorinated hydrocarbyloxy group. Each Q may be, for example, an alkyl, aryl, alkaryl or aralkyl group or an alkoxy, alkoxyaryl or aralkoxy group wherein the alkyl and aryl portions thereof are as described above. The preferred Q are those which are perfluorinated groups described above and most preferably a perfluorinated aryl, alkaryl or aralkyl group;

O represents oxygen;

Ct is the Precursor Cation and represents a cationic group capable of forming a neutral salt with the Precursor Anion material, preferably a remnant of a Brønsted acid; and each y, x, n and m represents an integer such that the ratio of the product of (m times x) to the product of (n times y) is one.

Suitable inorganic oxides for use in forming the T moiety of Formula I above include silicas, aluminas, aluminasilicates, aluminophosphates, titanias, clays and mixtures thereof. The preferred inorganic oxide are those of aluminas and silicas and most preferably those of silica. The support material can be in any physical form, such as, for example pelletized, granular, or an agglomerated form provided the material has a high degree of porosity and surface area. The support material should preferably have high surface area of from about 10 to 1000 $m^2/g$, preferably from 100 to 600 $m^2/g$ as determined by BET nitrogen porosimetry. Further, the pore volume of the support is preferably between 0.1 and 3 $cm^3/g$, more preferably between 0.2 to 2 $cm^3/g$ as determined by nitrogen absorption techniques. The particle size of the initial support material is not critical but is normally from 0.5 to 500 $\mu m$. Smaller particle size of from 0.5 to 100 $\mu m$ or even from 0.5 to 50 $\mu m$ is preferred especially when the catalyst composition is used in a continuous stirred tank reactor (CSTR) for the polymerization process. It has been unexpectedly found that the preferred smaller particle size support provides catalyst compositions of the present invention which exhibit enhanced catalytic activity (productivity in gm of polymer/gm of catalyst/hour).

The inorganic oxides useful in forming the support portion (T) of the Precursor Anion preferably will contain small amounts of hydroxyl groups pendent from its macromolecular structure. The hydroxyl groups are normally present in from 0.001 to 10 mmol/g, preferably from 0.01 to 5 mmol/g and most preferably from 0.5 to 3 mmol/g. The hydroxyl functionality can be determined by the technique of Fourier Transform Infrared Spectroscopy, as described by P. Griffiths et al, 83 Chemical Analysis 544 Wiley Interscience (1986).

The inorganic oxide should preferably be substantially free of functional groups other than hydroxyl groups. The hydroxyl groups are preferably surface hydroxyl groups, as described above. These groups directly or indirectly provide reactive sites through which covalent bonding of the silane linking group to the inorganic macromolecule structure occurs.

The inorganic oxide (T) is modified with a silane represented by the formula $$R'R''R'''SiH \qquad \text{(IIa)}$$

wherein each R', R" and R'" is independently selected from hydrogen, a substituted or unsubstituted $C_1-C_{20}$ hydrocarbyl as, for example, alkyl groups such as methyl, ethyl, n-propyl, isopropyl, butyl (all isomers), pentyl, decyl and the like as well as branched isomers, such as 3-ethyl-2,3-dimethyl hexyl, 2,2,4,4-tetramethyl pentyl and the like; cycloalkyl, such as cyclopentyl, cyclohexyl and the like; aryl, such as phenyl, biphenyl, and the like; alkaryl, such as toluyl and the like; aralkyl, such as 3-phenyl-n-propyl and the like; or a $C_1-C_{20}$ hydrocarbyloxy, for example, $C_1-C_{20}$ alkoxy such as methoxy, ethoxy and the like; aryloxy, such as phenoxy and the like. Each R' and R" is preferably independently selected from a $C_1-C_6$ hydrocarbyl or a $C_1-C_6$ hydrocarbyloxy. R'" is preferably selected from hydrogen atom. The preferred silanes are, for example phenyl silane, diphenyl silane, methylphenylsilane, dimethylsilane, diethylsilane, diethoxysilane and the like. The silane reactant used is preferably substantially free of halogen derivatives.

In the preferred embodiment, the silane and the inorganic oxide are contacted in the presence of a base, such as a tertiary amine as, for example, a tri($C_1-C_4$ alkyl)amine, to cause silanization of the inorganic oxide by reaction of the oxide's surface hydroxyl groups and removal of dihydrogen. This reaction is taught in Canadian Patent 1,087,595, which teaching is incorporated herein in its entirety by reference. The reaction can be carried out at temperatures of from about 0° to 110° C., preferably from 20 to 50° C. The silane is preferably present in excess to cause substantially complete reaction with the hydroxyl groups present on the inorganic oxide. The ratio of silica to inorganic oxide can be from 1 to 2500 mmol/g inorganic oxide and, preferably from 1.5 to 20 mmol/g. The reaction can be carried out in the presence of an inert hydrocarbon liquid and such liquid can be used to wash the reaction product free of unreacted silane and of base.

The resultant silane modified inorganic oxide has the silane moiety covalently bonded to the inorganic oxide through the support hydroxyl group's residual oxygen atom. The silane portion of the reaction product typically will contain at least one residual hydrogen atom directly bonded to the silicon atom of the silane moiety for further reaction, as described below.

The Precursor Ion Pair is formed by covalently bonding a metal or metalloid salt to the above-described silane modified inorganic oxide. The metal/metalloid salt preferably has a free hydroxyl group which can react with the hydrogen atom of the silane moiety to cause the metal/metalloid containing group to be covalently bonded to the inorganic oxide support through the silane moiety. This reaction is free from halogen forming reaction by-products or the use of a halogen reactant and, therefore, provides a Precursor Ion Pair which is free of halogen.

The precursor metal/metalloid salt used to form the subject supported Precursor Ion Pair of Formula I can be represented by the formula:

$$[Ct]^{\oplus}[(Q)_3MD(OH)]^{\ominus} \qquad \text{(IIb)}$$

wherein Ct represents the Precursor Cation which is a cationic remnant of a Brønsted acid salt, an oxidizing cation, a carbonium ion or a silylium ion; Q, M and D are as defined above and (OH) represents a hydroxyl group.

These salts can be readily formed from a halo (X, preferably bromo) hydroxy substituted D compound [i.e., X—D-(OH)] by initially capping the hydroxyl group with a protective group, such as a 1,1,1,3,3,3-hexa($C_1$–$C_6$ alkyl) disilazane [$(R_3Si)_2NH$]. This reaction can be carried out neat or in an inert hydrocarbon solvent at elevated temperatures (20–100° C.) for short periods of time (0.5–5 hours). A Grignard product is then produced by treating the capped compound in a conventional manner to produce a Grignard reagent, such as contacting the capped compound with Mg in the presence of a diluent, such as tetrahydrofurane or the like, at elevated temperatures. The Grignard reagent is then contacted with a $M(Q)_3$ reactant to produce an anionic metalloid derivative, $(Q)_3MD$—$OSiR_3$. The protective capping group can then be removed through cation exchange to yield the above metalloid hydroxy derivative IIb.

In the above reactions, the capping reagent is preferably a hexa($C_1$–$C_3$ alkyl) disilazane and most preferably hexamethyl disilazane. The $M(Q)_3$ reagent is preferably a tris (perfluorophenyl) compound of boron or aluminum and most preferably of boron. Removal of the capping group is preferably accomplished by cation exchange and protonation with a Brønsted acid, such as a trihydrocarbyl ammonium salt (e.g., triethyl ammonium, phenyl dimethyl ammonium and the like) or a cyclic hydrocarbylammonium such as dimethyl anilinium and the like. This protonation can be conducted using aqueous solutions and, therefore, the resultant metalloid salt can be washed free of any halogen by-product.

Examples of hydroxy containing metalloids are anilinium and ammonium salts of (4-hydroxyphenyl)tris pentafluorophenyl borate, [4-(4'-hydroxyphenyl)phenyl] tris pentafluorophenyl borate, (6-hydroxy-2-napthyl) tris pentafluorophenyl borate, tris(pentafluorophenyl) (4-hydroxy tetrafluorophenyl) borate, tris (2,4-difluorophenyl) (4-hydroxyphenyl) borate, tris (3,5-trifluoromethyl phenyl) (4-hydroxyphenyl) borate, tris (pentafluorophenyl) (3,5-dimethyl-4-hydroxyphenyl) borate, tris (pentafluorophenyl) (4-hydroxy cyclohexyl) borate and the like. The preferred D is perfluorophenyl. The preferred D are unsubstituted and substituted (e.g., halo, most preferably perhalo or $C_1$–$C_6$ hydrocarbyl): arylene, fused arylenes and polyarylenes groups.

The Precursor Cation of the Precursor Ion Pair is selected to ensure that it is capable of inducing a release of at least one L group from the Cation Component starting material defined by structural formulas III or IV (described hereinbelow). Such release can occur typically through protonation, abstraction or oxidation of such group by the Precursor Cation. The effect of said protonation, abstraction, or oxidation is conversion of said Cation Component starting material into the Cation Component of the Catalyst Composition when contacted with the Precursor Ion Pair.

Accordingly, suitable Precursor Cations can be selected from a Brønsted acid cation, such as tris-hydrocarbyl ammonium cations wherein each hydrocarbyl group is independently selected from a $C_1$–$C_{20}$ alkyl or a $C_6$–$C_{12}$ aryl or substituted aryl and the like. Examples of said tris hydrocarbyl ammonium cations include trimethyl ammonium, triethyl ammonium, tripropyl ammonium, tri(n-butyl) ammonium, phenyl dimethyl ammonium (also known as N,N-dimethyl anilinium), phenyl diethyl ammonium (N,N'-diethyl anilinium), dimethyl(2,4,6-trimethylphenyl) ammonium and the like. Also dialkyl ammonium cations, such as di(n-propyl) ammonium, dicyclohexyl ammonium and the like; tri (hydrocarbyl) phosphonium cations, such as triphenyl phosphonium, tri(methyl phenyl) phosphonium, tri (dimethyl phenyl) phosphonium and the like; di(hydrocarbyl) sulphonium, such as dimethyl sulphonium, diethyl sulphonium and the like.

A second type of suitable Precursor Cation is a stable carbonium or silylium ion containing up to 30 non-hydrogen atoms. These cations operate through abstraction mechanism. The cation is capable of reacting with a substituent of the transition metal compound and converting it into a catalytically active transition metal complex. Suitable examples of carbonium cations include tropyllium, triphenylmethylium, and benzene(diazonium) cations. Silylium salts have been previously generically disclosed in *J. Chem Soc. Chem Comm.*, 1993, 383–384, as well as Lambert, J. B., et al., *Organometallics*, 1994. 13, 2430–2443. Preferred silylium cations are trimethylsilylium, triethylsilylium and ether substituted adducts thereof.

Another suitable type of cation is a cationic oxidizing agent having a charge of e+ and e is an integer from 1 to 3.

Examples of cationic oxidizing agents include; ferrocenium, hydrocarbyl-substituted ferrocenium, Ag+, and K+.

The formed hydroxyl metalloid salt (IIb) has been found to react with at least one of the residual hydrogen atoms of the silane moiety which has been covalently bonded to the inorganic oxide support, as described hereinabove. Specifically, the Si—H bonds remaining on the silane moiety of the silane capped inorganic oxide has been found to be reactive towards weak acids, such as hydroxyl (alcohol) groups with the liberation of dihydrogen. Thus, the coupling of a hydroxyl containing metalloid, such as a hydroxyl containing borate with silane modified supports as, for example, silane modified silicas, generates an inorganic support bound metalloid. This reaction has been found useful in providing an anionic supported metalloid which is not generated by the use of a halogen containing reactant by dehydrohalogenation.

The metalloid salt and the silane modified inorganic oxide support can be contacted at moderate temperatures, such as from 10° to 30° C., or at elevated temperatures, such as from 30° C. to reflux temperatures in the presence of a diluent. The diluent may be, for example, a hydrocarbon such as toluene, hexane and the like; or an ether such as diethyl ether, dioxane and the like. The ratio of hydroxylated metalloid salt to silane modified support can be from about 0.1 to 10 and preferably from about 0.3 to 1. The reaction produces dihydrogen gas may be monitored by gas chromatography or other known analytical techniques.

The resultant Precursor Ion Pair has certain features which are believed to aid in causing the present catalyst composition to achieve a combination of desired properties, as discussed hereinabove. Although the present observations are not meant to be a limitation of the subject invention and the claims appended hereto, it is believed that the present Precursor Anion (i.e., Anion Component of the Catalyst Composition) provides a highly active catalyst composition when combined with the present Cation Component because (a) the anionic metalloid site thereof is separated and held in a sterically hindered position from the oxygen atoms surrounding the silane moiety and from those of the inorganic oxide surface atoms by a bulky group D, as defined above; (b) the silane bridging group and the R' and R" groups thereof further provide separation between the anionic metalloid atom (which, when combined with the Cation Component is associated with the catalytic site thereof) and the inorganic oxide surface atoms; and (c) the silane bridging group, as discussed above, provides an Anion Component which is free of halogen containing species capable of inhibiting the activity of the resultant catalyst composition.

The quantity of metalloid salt reacted with the silane modified inorganic oxide is not critical. However, the metalloid salt typically ranges from 0.001 to about 5000 (e.g., 0.1–3000), preferably from 1 to 2,000 mmoles/g of silane modified inorganic oxide support. Most preferably the Precursor Anion contains from 10 to 1,000 micromoles of metalloid per gram of treated support material.

The Precursor Ion Pair found useful herein can be stored or shipped either neat or slurried in an inert diluent under inert conditions or can be used directly to provide the present catalyst composition.

As stated above, the preferred Precursor Ion Pair comprises a silica moiety T, a silane bridge moiety wherein each R' and R" is a $C_1$–$C_6$ hydrocarbyl, a sterically bulky hydrocarbyl group (D), a metalloid of boron and fluorinated hydrocarbyl groups covalently bonded to the metalloid to provide the Precursor Anion and a Precursor Cation capable of inducing the formation of Cation Component of the subject catalyst composition. Table I provides illustrative examples of preferred combinations of each moiety forming the Precursor Ion Pair.

TABLE I $$\left[ T{-}Si\begin{array}{c}R''\\|\\|\\R'\end{array}{-}O{-}D{-}M\begin{array}{c}Q\\|\\|\\Q\end{array}{-}Q \right]^{y-} [Ct]^{x+}$$

| Example | T | $R^1$ | $R^2$ | D | M | Q | Q | Q |
|---|---|---|---|---|---|---|---|---|
| 1 | Silica | H | Ph | —$C_6H_4$— | B | $C_6F_5$ | $C_6F_5$ | $C_6F_5$ |
| 2 | Silica | H | Ph | —$(C_6H_4)_2$— | B | $C_6F_5$ | $C_6F_5$ | $C_6F_5$ |
| 3 | Silica | H | Ph | —$C_{10}H_6$— | B | $C_6F_5$ | $C_6F_5$ | $C_6F_5$ |
| 4 | Silica | Me | Me | —$C_6H_4$— | B | $C_6F_5$ | $C_6F_5$ | $C_6F_5$ |
| 5 | Silica | Me | Me | —$(C_6H_4)_2$— | B | $C_6F_5$ | $C_6F_5$ | $C_6F_5$ |
| 6 | Silica | Me | Me | —$C_{10}H_6$— | B | $C_6F_5$ | $C_6F_5$ | $C_6F_5$ |
| 7 | Silica | Ph | Me | —$C_6H_4$— | B | $C_6F_5$ | $C_6F_5$ | $C_6F_5$ |
| 8 | Silica | Ph | Me | —$(C_6H_4)_2$— | B | $C_6F_5$ | $C_6F_5$ | $C_6F_5$ |
| 9 | Silica | Ph | Me | —$C_{10}H_6$— | B | $C_6F_5$ | $C_6F_5$ | $C_6F_5$ |
| 10 | Silica | Et | Et | —$C_6H_4$— | B | $C_6F_5$ | $C_6F_5$ | $C_6F_5$ |
| 11 | Silica | Et | Et | —$(C_6H_4)_2$— | B | $C_6F_5$ | $C_6F_5$ | $C_6F_5$ |
| 12 | Silica | Et | Et | —$C_{10}H_6$— | B | $C_6F_5$ | $C_6F_5$ | $C_6F_5$ |
| 13 | Silica | Ph | Ph | —$C_6H_4$— | B | $C_6F_5$ | $C_6F_5$ | $C_6F_5$ |
| 14 | Silica | Ph | Ph | —$(C_6H_4)_2$— | B | $C_6F_5$ | $C_6F_5$ | $C_6F_5$ |
| 15 | Silica | Ph | Ph | —$C_{10}H_6$— | B | $C_6F_5$ | $C_6F_5$ | $C_6F_5$ |
| 16 | Silica | H | Ph | —$C_6F_4$— | B | $C_6F_5$ | $C_6F_5$ | $C_6F_5$ |
| 17 | Silica | H | Ph | —$(C_6F_4)_2$— | B | $C_6F_5$ | $C_6F_5$ | $C_6F_5$ |
| 18 | Silica | H | Ph | —$C_{10}F_6$— | B | $C_6F_5$ | $C_6F_5$ | $C_6F_5$ |
| 19 | Silica | Me | Me | —$C_6F_4$— | B | $C_6F_5$ | $C_6F_5$ | $C_6F_5$ |
| 20 | Silica | Me | Me | —$(C_6F_4)_2$— | B | $C_6F_5$ | $C_6F_5$ | $C_6F_5$ |
| 21 | Silica | Me | Me | —$C_{10}F_6$— | B | $C_6F_5$ | $C_6F_5$ | $C_6F_5$ |
| 22 | Silica | Ph | Me | —$C_6F_4$— | B | $C_6F_5$ | $C_6F_5$ | $C_6F_5$ |
| 23 | Silica | Ph | Me | —$(C_6F_4)_2$— | B | $C_6F_5$ | $C_6F_5$ | $C_6F_5$ |
| 24 | Silica | Ph | Me | —$C_{10}F_6$— | B | $C_6F_5$ | $C_6F_5$ | $C_6F_5$ |
| 25 | Silica | Et | Et | —$C_6F_4$— | B | $C_6F_5$ | $C_6F_5$ | $C_6F_5$ |
| 26 | Silica | Et | Et | —$(C_6F_4)_2$— | B | $C_6F_5$ | $C_6F_5$ | $C_6F_5$ |
| 27 | Silica | Et | Et | —$C_{10}F_6$— | B | $C_6F_5$ | $C_6F_5$ | $C_6F_5$ |
| 28 | Silica | Ph | Ph | —$C_6F_4$— | B | $C_6F_5$ | $C_6F_5$ | $C_6F_5$ |
| 29 | Silica | Ph | Ph | —$(C_6F_4)_2$— | B | $C_6F_5$ | $C_6F_5$ | $C_6F_5$ |
| 30 | Silica | Ph | Ph | —$C_{10}F_6$— | B | $C_6F_5$ | $C_6F_5$ | $C_6F_5$ |
| 31 | Alumina | H | Ph | —$C_6H_4$— | B | $C_6F_5$ | $C_6F_5$ | $C_6F_5$ |
| 32 | Alumina | H | Ph | —$(C_6H_4)_2$— | B | $C_6F_5$ | $C_6F_5$ | $C_6F_5$ |
| 33 | Alumina | H | Ph | —$C_{10}H_6$— | B | $C_6F_5$ | $C_6F_5$ | $C_6F_5$ |
| 34 | Alumina | Me | Me | —$C_6H_4$— | B | $C_6F_5$ | $C_6F_5$ | $C_6F_5$ |
| 35 | Alumina | Ph | Me | —$C_6H_4$— | B | $C_6F_5$ | $C_6F_5$ | $C_6F_5$ |
| 36 | Alumina | Ph | Me | —$(C_6H_4)_2$— | B | $C_6F_5$ | $C_6F_5$ | $C_6F_5$ |
| 37 | Alumina | H | Ph | —$C_6F_4$— | B | $C_6F_5$ | $C_6F_5$ | $C_6F_5$ |
| 38 | Alumina | H | Ph | —$(C_6F_4)_2$— | B | $C_6F_5$ | $C_6F_5$ | $C_6F_5$ |
| 39 | Alumina | H | Ph | —$C_{10}F_6$— | B | $C_6F_5$ | $C_6F_5$ | $C_6F_5$ |
| 40 | Alumina | Me | Me | —$C_6F_4$— | B | $C_6F_5$ | $C_6F_5$ | $C_6F_5$ |
| 41 | Alumina | Ph | Me | —$C_6F_4$— | B | $C_6F_5$ | $C_6F_5$ | $C_6F_5$ |
| 42 | Alumina | Ph | Me | —$(C_6F_4)_2$— | B | $C_6F_5$ | $C_6F_5$ | $C_6F_5$ |

NOTE: In Table I above, the above abbreviations have the following meaning:

Me=$CH_3$—; Et=$CH_3CH_2$—; Ph=phenyl; —$C_6$—$H_4$—=phenylene; —$C_{10}H_6$—=naphthylene; $C_6F_4$=tetrafluorophenylene; $C_{10}F_6$=hexafluoronaphthylene; $C_6F_5$=perfluorophenyl.

Each of the Precursor Anions (Examples 1 through 42) listed in Table I above is combined with each of the following Precursor Cations (Ct), respectively, to provide the preferred Precursor Ion Pairs indicated above:

(a) [N,N-dimethylaninilium]

(b) [triphenyl carbonium]

(c) [tropyllium]

(d) [Ferrocinium]

(e) [$Ag^+$]

(f) [$K^+$]

It has further been unexpectedly observed that a catalyst composition of enhanced activity can be produced by first calcining the inorganic oxide from which the Precursor Anion is derived at moderate temperatures followed by reaction with a silane (IIa), as described above which, in turn, is followed by contacting the silane modified inorganic oxide with a trialkyl aluminum reagent and then proceeding with the reaction of the metalloid salt (IIb) to provide the preferred Precursor Ion Pair, as described above. Although it is well known that calcining of inorganic oxides, such as silica, reduces the hydroxyl content of the silica, it has been found that conventional calcining at temperatures of above 900K (ca. 625° C.) does not result in the most active catalyst composition. It has been unexpectedly found that by limiting the heating of the initial inorganic oxide (T) to temperatures of from about 400° C. to about 550° C., preferably from about 475° to 525° C., one attains an inorganic oxide (T) with enhanced reactivity to the silane and without loss of its other desired physical and chemical properties. The silane modified inorganic oxide is then preferably treated with a $C_1$–$C_6$ trialkyl aluminum, preferably treated with a slight excess of the trialkyl aluminum (molar ratio of Al to OH of from about 2 to 5) in an inert solvent such as a hydrocarbon solvent (e.g., hexane and the like). The excess trialkyl aluminum reagent may be removed. The passivated silane modified inorganic oxide is then reacted with the hydroxy containing metalloid salt (IIb) in a diluent (e.g., toluene, dialkyl ether, dioxane or the like) to provide a preferred passivated Precursor Anion. The term "passivated", as used in this specification and in the appended claims, refers to a support material (T) which has been treated with a trialkyl aluminum agent subsequent to silanization and prior to metalloid addition. It is believed, though not meant to be a limitation on this teaching or the scope of the claims appended hereto, that, especially where silica is the inorganic oxide, less of the surface hydroxyl groups are forced into strained siloxane bond configuration than is normally caused by high temperature calcination. Further, the trialkyl aluminum and the residual hydroxy groups form dialkyl aluminum oxy groups (—O—$AlR_2$) to provide the passivated support material.

The Cation Component of the Catalyst Composition is derived by contacting the Precursor Ion Pair described above with at least one bidentate and tridentate transition metal compound. The bidentate compound can be generically represented by the formula:

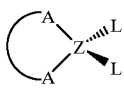

and the tridentate compound can be generically represented by the formula:

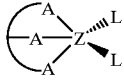

wherein in each of formulas III and IV above:
  each A independently represents an oxygen, sulfur, phosphorous or nitrogen and preferably represents oxygen or nitrogen or a combination thereof and most preferably each A in III and at least two A's of IV represent nitrogen;
  Z represents at least one Group IV or VII transition metal selected from Fe, Co, Ni, Ru, Rh, Pd, Os, Ir, Pt in the +2 oxidation state or Ti, Zr, Hf in the +2, +3 or +4 oxidation states, preferably a late transition metal selected from iron, cobalt, nickel or palladium and most preferably iron or cobalt; and
  each L independently represents an anionic ligand group selected from the group consisting of hydrogen, halo, and hydrocarbyl. More specifically, the hydrocarbyl group can be substituted or unsubstituted, cyclic or non-cyclic, linear or branched, aliphatic, aromatic, or mixed aliphatic and aromatic including hydrocarbylene, hydrocarbyloxy, hydrocarbyl, silyl, hydrocarbyl amino, and hydrocarbyl siloxy radicals having up to 50 non-hydrogen atoms. The preferred L groups are independently selected from halo, hydrocarbyl, and substituted hydrocarbyl radicals. The hydrocarbyl radical may contain from 1 to 20 carbon atoms, preferably from 1 to 12 carbon atoms and the substitution group is preferably a halogen atom. In certain instances there may be three (3) L groups covalently bonded to Z. However, this is not preferred.

The lines joining each A to each other A represent a hydrocarbylene radical providing a ring or fused ring hydrocarbylene structure or substituted hydrocarbylene structure. Portions of the structure may be comprised of carbon—carbon double bonds, carbon—carbon single bonds, carbon-A atom double bonds and carbon-A atom single bonds.

Typically, for the bidentate and tridentate transition metal compounds, A, Z and the carbons includable in the line connecting the (A) groups collectively can be joined to make a 5, 6, or 7 membered ring.

The bonds between each A atom of the catalyst ligand and the transition metal Z can be either a dative bond or a covalent bond. Dative bonds merely represent a relationship between electron rich A atom and the metal to increase the electron density of the metal by providing electrons within the empty orbitals of the metal.

The above described bidentate and tridentate compounds from which the subject catalyst composition are derived are known. The disclosure of such components and the methods of forming same have been described in various publications, including WO 96/23010; Journal of the American Chemical Society (JACS) 1998, 120, 6037–6046, JACS 1995, 117, 6414–6415 and Supplemental Teachings; JACS 1996, 118, 1518; Macromol. Rapid Commun. 19, 31–34 (1998); Caltech Highlights 1997, 65–66; Chem Week 4/29/98, 72; C&EN 4/13/98 11–12; JACS 1998, 120, 4049–4050; JACS Vol. 82, 820–824; JACS Vol. 79, 2733–2738; Japanese Pat. Application 02-078,663. The teaching of each of the above cited references are incorporated herein in its entirety by reference.

In formulas III and IV, each L group is preferably a halogen atom, an unsubstituted hydrocarbyl or a hydrocarbyloxy group. The most preferred compounds are those having each L selected from hydrocarbyl groups or together form a hydrocarbylene group more typically an aliphatic, aromatic or mixed aliphatic and aromatic hydrocarbylene group as described above, which together with Z forms a cyclic group (preferably a 3 to 7, most preferably 3 to 5 member cyclic group).

Preferred bidentate compounds may, for example be represented as compounds of the formula:

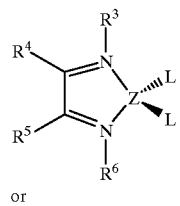

or

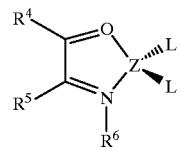

wherein:
  $R^3$ and $R^6$ of IIIa or $R^6$ of IIIb are each independently selected from an unsubstituted or substituted $C_1$–$C_{20}$, preferably $C_3$–$C_{20}$ hydrocarbyl, such as alkyl, aryl, alkaryl or aralkyl group as, for example, i-propyl, t-butyl, 2,6-dilsopropylphenyl, their flourinated derivatives and the like, or with adjacent groups, together, may represent a $C_3$–$C_{20}$ hydrocarbylene group. Further, it is understood that in those instances where a hetero atom A (e.g., oxygen, nitrogen) of a bidentate compound has only a single covalent bond to the hydrocarbylene moiety of said compound, the hetero atom has an additional R group bonded thereto and such R group is independently selected from the above groups represented by $R^3$;
  $R^4$ and $R^5$ are each independently selected from hydrogen, an unsubstituted or substituted $C_1$–$C_{20}$ hydrocarbyl such as an alkyl, aryl, alkaryl or aralkyl group as, for example, methyl, ethyl, i-propyl, butyl (all isomers), phenyl, toluyl, 2,6-diisopropyl phenyl and the like; or $R^4$ and $R^5$ taken together provide an unsubstituted or substituted $C_3$–$C_{20}$ ring forming hydrocarbylene group, such as hexylene, 1,8-naphthylene and the like.
  Z and each L are as defined above. It is preferred that Z be selected from nickel or palladium and that each L be independently selected from chlorine, bromine, iodine or a $C_1$–$C_8$ (more preferably $C_1$–$C_4$) alkyl.

Illustrative of bidentate compounds which are useful in providing the catalyst composition of the present invention are compounds of IIIa having the following combination of groups:

TABLE II

IIIa

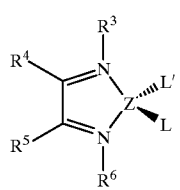

| # | $R^3$ | $R^4$ | $R^5$ | $R^6$ | L | L' | Z |
|---|---|---|---|---|---|---|---|
| 1 | 2,6-i-PrPh | Me | Me | 2,6-i-PrPh | Me | b | Pd |
| 2 | 2,6-i-PrPh | Me | Me | 2,6-i-PrPh | Me | Me | Pd |
| 3 | 2,6-i-PrPh | Me | Me | 2,6-i-PrPh | Me | Br | Pd |
| 4 | 2,6-i-PrPh | Me | Me | 2,6-i-PrPh | Me | Cl | Pd |
| 5 | 2,6-i-PrPh | Me | Me | 2,6-i-PrPh | Br | Br | Pd |
| 6 | 2,6-i-PrPh | Me | Me | 2,6-i-PrPh | Cl | Cl | Pd |
| 7 | 2,6-i-PrPh | Me | Me | 2,6-i-PrPh | Br | Br | Ni |
| 8 | 2,6-i-PrPh | Me | Me | 2,6-i-PrPh | Cl | Cl | Ni |
| 9 | 2,6-i-PrPh | Me | Me | 2,6-i-PrPh | Me | Me | Ni |
| 10 | 2,6-i-PrPh | Me | Me | 2,6-i-PrPh | Me | Br | Ni |
| 11 | 2,6-i-PrPh | Me | Me | 2,6-i-PrPh | Me | Cl | Ni |
| 12 | 2,6-MePh | Me | Me | 2,6-Me-Ph | Me | b | Pd |
| 13 | 2,6-MePh | Me | Me | 2,6-Me-Ph | Me | Me | Pd |
| 14 | 2,6-MePh | Me | Me | 2,6-Me-Ph | Me | Br | Pd |
| 15 | 2,6-MePh | Me | Me | 2,6-Me-Ph | Me | Cl | Pd |
| 16 | 2,6-MePh | Me | Me | 2,6-Me-Ph | Br | Br | Pd |
| 17 | 2,6-MePh | Me | Me | 2,6-Me-Ph | Cl | Cl | Pd |
| 18 | 2,6-i-PrPh | H | H | 2,6-i-PrPh | Me | b | Pd |
| 19 | 2,6-i-PrPh | H | H | 2,6-i-PrPh | Me | Me | Pd |
| 20 | 2,6-i-PrPh | H | H | 2,6-i-PrPh | Me | Br | Pd |
| 21 | 2,6-i-PrPh | H | H | 2,6-i-PrPh | Me | Cl | Pd |
| 22 | 2,6-i-PrPh | H | H | 2,6-i-PrPh | Br | Br | Pd |
| 23 | 2,6-i-PrPh | H | H | 2,6-i-PrPh | Cl | Cl | Pd |
| 24 | 2,6-i-PrPh | H | H | 2,6-i-PrPh | Br | Br | Ni |
| 25 | 2,6-i-PrPh | H | H | 2,6-i-PrPh | Cl | Cl | Ni |
| 26 | 2,6-i-PrPh | H | H | 2,6-i-PrPh | Me | Me | Ni |
| 27 | 2,6-i-PrPh | H | H | 2,6-i-PrPh | Me | Br | Ni |
| 28 | 2,6-i-PrPh | H | H | 2,6-i-PrPh | Me | Cl | Ni |
| 29 | 2,6-i-PrPh | An | An | 2,6-i-PrPh | Me | b | Pd |
| 30 | 2,6-i-PrPh | An | An | 2,6-i-PrPh | Me | Me | Pd |
| 31 | 2,6-i-PrPh | An | An | 2,6-i-PrPh | Me | Br | Pd |
| 32 | 2,6-i-PrPh | An | An | 2,6-i-PrPh | Me | Cl | Pd |
| 33 | 2,6-i-PrPh | An | An | 2,6-i-PrPh | Br | Br | Pd |
| 34 | 2,6-i-PrPh | An | An | 2,6-i-PrPh | Cl | Cl | Pd |
| 35 | 2,6-i-PrPh | An | An | 2,6-i-PrPh | Br | Br | Ni |
| 36 | 2,6-i-PrPh | An | An | 2,6-i-PrPh | Cl | Cl | Ni |
| 37 | 2,6-i-PrPh | An | An | 2,6-i-PrPh | Me | Me | Ni |
| 38 | 2,6-i-PrPh | An | An | 2,6-i-PrPh | Me | Br | Ni |
| 39 | 2,6-i-PrPh | An | An | 2,6-i-PrPh | Me | Cl | Ni |
| 40 | 2,6-MePh | An | An | 2,6-Me-Ph | Me | b | Pd |
| 41 | 2,6-MePh | An | An | 2,6-Me-Ph | Me | Me | Pd |
| 42 | 2,6-MePh | An | An | 2,6-Me-Ph | Me | Br | Pd |
| 43 | 2,6-MePh | An | An | 2,6-Me-Ph | Me | Cl | Pd |
| 44 | 2,6-MePh | An | An | 2,6-Me-Ph | Br | Br | Pd |
| 45 | 2,6-MePh | An | An | 2,6-Me-Ph | Cl | Cl | Pd |
| 46 | 2,6-MePh | H | H | 2,6-Me-Ph | Me | b | Pd |
| 47 | 2,6-MePh | H | H | 2,6-Me-Ph | Me | Me | Pd |
| 48 | 2,6-MePh | H | H | 2,6-Me-Ph | Me | Br | Pd |
| 49 | 2,6-MePh | H | H | 2,6-Me-Ph | Me | Cl | Pd |
| 50 | 2,6-MePh | H | H | 2,6-Me-Ph | Br | Br | Pd |
| 51 | 2,6-MePh | H | H | 2,6-Me-Ph | Cl | Cl | Pd |
| 52 | 2,6-MePh | Me | Me | 2,6-Me-Ph | Br | Br | Ni |
| 53 | 2,6-MePh | Me | Me | 2,6-Me-Ph | Cl | Cl | Ni |
| 54 | 2,6-MePh | Me | Me | 2,6-Me-Ph | Me | Me | Ni |
| 55 | 2,6-MePh | Me | Me | 2,6-Me-Ph | Me | Br | Ni |
| 56 | 2,6-MePh | Me | Me | 2,6-Me-Ph | Me | Cl | Ni |
| 57 | 2,4,6-MePh | Me | Me | 2,4,6-MePh | Me | b | Pd |
| 58 | 2,4,6-MePh | Me | Me | 2,4,6-MePh | Me | Me | Pd |
| 59 | 2,4,6-MePh | Me | Me | 2,4,6-MePh | Me | Br | Pd |
| 60 | 2,4,6-MePh | Me | Me | 2,4,6-MePh | Me | Cl | Pd |
| 61 | 2,4,6-MePh | Me | Me | 2,4,6-MePh | Br | Br | Pd |
| 62 | 2,4,6-MePh | Me | Me | 2,4,6-MePh | Cl | Cl | Pd |
| 63 | 2,4,6-MePh | Me | Me | 2,4,6-MePh | Br | Br | Ni |

TABLE II-continued

IIIa

| # | $R^3$ | $R^4$ | $R^5$ | $R^6$ | L | L' | Z |
|---|---|---|---|---|---|---|---|
| 64 | 2,4,6-MePh | Me | Me | 2,4,6-MePh | Cl | Cl | Ni |
| 65 | 2,4,6-MePh | Me | Me | 2,4,6-MePh | Me | Me | Ni |
| 66 | 2,4,6-MePh | Me | Me | 2,4,6-MePh | Me | Br | Ni |
| 67 | 2,4,6-MePh | Me | Me | 2,4,6-MePh | Me | Cl | Ni |
| 68 | 2,4,6-MePh | H | H | 2,4,6-MePh | Me | b | Pd |
| 69 | 2,4,6-MePh | H | H | 2,4,6-MePh | Me | Me | Pd |
| 70 | 2,4,6-MePh | H | H | 2,4,6-MePh | Me | Br | Pd |
| 71 | 2,4,6-MePh | H | H | 2,4,6-MePh | Me | Cl | Pd |
| 72 | 2,4,6-MePh | H | H | 2,4,6-MePh | Br | Br | Pd |
| 73 | 2,4,6-MePh | H | H | 2,4,6-MePh | Cl | Cl | Pd |
| 74 | 2,4,6-MePh | H | H | 2,4,6-MePh | Br | Br | Ni |
| 75 | 2,4,6-MePh | H | H | 2,4,6-MePh | Cl | Cl | Ni |
| 76 | 2,4,6-MePh | H | H | 2,4,6-MePh | Me | Me | Ni |
| 77 | 2,4,6-MePh | H | H | 2,4,6-MePh | Me | Br | Ni |
| 78 | 2,4,6-MePh | H | H | 2,4,6-MePh | Me | Cl | Ni |
| 79 | 2,4,6-MePh | An | An | 2,4,6-MePh | Me | b | Pd |
| 80 | 2,4,6-MePh | An | An | 2,4,6-MePh | Me | Me | Pd |
| 81 | 2,4,6-MePh | An | An | 2,4,6-MePh | Me | Br | Pd |
| 82 | 2,4,6-MePh | An | An | 2,4,6-MePh | Me | Cl | Pd |
| 83 | 2,4,6-MePh | An | An | 2,4,6-MePh | Br | Br | Pd |
| 84 | 2,4,6-MePh | An | An | 2,4,6-MePh | Cl | Cl | Pd |
| 85 | 2,4,6-MePh | An | An | 2,4,6-MePh | Br | Br | Ni |
| 86 | 2,4,6-MePh | An | An | 2,4,6-MePh | Cl | Cl | Ni |
| 87 | 2,4,6-MePh | An | An | 2,4,6-MePh | Me | Me | Ni |
| 88 | 2,4,6-MePh | An | An | 2,4,6-MePh | Me | Br | Ni |
| 89 | 2,4,6-MePh | An | An | 2,4,6-MePh | Me | Cl | Ni |
| 90 | Ph | a | a | Ph | Me | Me | Pd |
| 91 | Ph | Me | Me | Ph | Me | Me | Pd |
| 92 | Ph | H | H | Ph | Me | Me | Pd |
| 93 | Ph | An | An | Ph | Me | Me | Pd |
| 90 | Ph | a | a | Ph | Me | Cl | Pd |
| 91 | Ph | Me | Me | Ph | Me | Cl | Pd |
| 92 | Ph | H | H | Ph | Me | Cl | Pd |
| 93 | Ph | An | An | Ph | Me | Cl | Pd |
| 94 | 2-PhPh | a | a | 2-PhPh | Me | Me | Pd |
| 95 | 2-PhPh | Me | Me | 2-PhPh | Me | Me | Pd |
| 96 | 2-PhPh | H | H | 2-PhPh | Me | Me | Pd |
| 97 | 2-PhPh | An | An | 2-PhPh | Me | Me | Pd |
| 94 | 2-PhPh | a | a | 2-PhPh | Me | Cl | Pd |
| 95 | 2-PhPh | Me | Me | 2-PhPh | Me | Cl | Pd |
| 96 | 2-PhPh | H | H | 2-PhPh | Me | Cl | Pd |
| 97 | 2-PhPh | An | An | 2-PhPh | Me | Cl | Pd |
| 98 | 2,6-EtPh | a | a | 2,6-EtPh | Me | Me | Pd |
| 99 | 2,6-EtPh | Me | Me | 2,6-EtPh | Me | Me | Pd |
| 100 | 2,6-EtPh | H | H | 2,6-EtPh | Me | Me | Pd |
| 101 | 2,6-EtPh | An | An | 2,6-EtPh | Me | Me | Pd |
| 102 | 2,6-EtPh | a | a | 2,6-EtPh | Me | Cl | Pd |
| 103 | 2,6-EtPh | Me | Me | 2,6-EtPh | Me | Cl | Pd |
| 104 | 2,6-EtPh | H | H | 2,6-EtPh | Me | Cl | Pd |
| 105 | 2,6-EtPh | An | An | 2,6-EtPh | Me | Cl | Pd |
| 106 | 2-t-BuPh | a | a | 2-t-BuPh | Me | Me | Pd |
| 107 | 2-t-BuPh | Me | Me | 2-t-BuPh | Me | Me | Pd |
| 108 | 2-t-BuPh | H | H | 2-t-BuPh | Me | Me | Pd |
| 109 | 2-t-BuPh | An | An | 2-t-BuPh | Me | Me | Pd |
| 110 | 2-t-BuPh | a | a | 2-t-BuPh | Me | Cl | Pd |
| 111 | 2-t-BuPh | Me | Me | 2-t-BuPh | Me | Cl | Pd |
| 112 | 2-t-BuPh | H | H | 2-t-BuPh | Me | Cl | Pd |
| 113 | 2-t-BuPh | An | An | 2-t-BuPh | Me | Cl | Pd |
| 114 | 1-Np | a | a | 1-Np | Me | Me | Pd |
| 115 | 1-Np | Me | Me | 1-Np | Me | Me | Pd |
| 116 | 1-Np | H | H | 1-Np | Me | Me | Pd |
| 117 | 1-Np | An | An | 1-Np | Me | Me | Pd |
| 118 | $PhCH_2$ | a | a | $PhCH_2$ | Me | Cl | Pd |
| 119 | $PhCH_2$ | Me | Me | $PhCH_2$ | Me | Cl | Pd |
| 120 | $PhCH_2$ | H | H | $PhCH_2$ | Me | Cl | Pd |
| 121 | $PhCH_2$ | An | An | $PhCH_2$ | Me | Cl | Pd |

TABLE II-continued

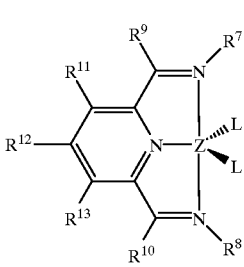

IIIa

| # | R³ | R⁴ | R⁵ | R⁶ | L | L' | Z |
|---|---|---|---|---|---|---|---|
| 122 | PhCH₂ | a | a | PhCH₂ | Me | Me | Pd |
| 123 | PhCH₂ | Me | Me | PhCH₂ | Me | Me | Pd |
| 124 | PhCH₂ | H | H | PhCH₂ | Me | Me | Pd |
| 125 | PhCH₂ | An | An | PhCH₂ | Me | Me | Pd |
| 126 | PhCH₂ | a | a | PhCH₂ | Me | Cl | Pd |
| 127 | PhCH₂ | Me | Me | PhCH₂ | Me | Cl | Pd |
| 128 | PhCH₂ | H | H | PhCH₂ | Me | Cl | Pd |
| 129 | PhCH₂ | An | An | PhCH₂ | Me | Cl | Pd |
| 130 | Ph₂CH | a | a | Ph₂CH | Me | Me | Pd |
| 131 | Ph₂CH | Me | Me | Ph₂CH | Me | Me | Pd |
| 132 | Ph₂CH | H | H | Ph₂CH | Me | Me | Pd |
| 133 | Ph₂CH | An | An | Ph₂CH | Me | Me | Pd |
| 134 | Ph₂CH | a | a | Ph₂CH | Me | Cl | Pd |
| 135 | Ph₂CH | Me | Me | Ph₂CH | Me | Cl | Pd |
| 136 | Ph₂CH | H | H | Ph₂CH | Me | Cl | Pd |
| 137 | Ph₂CH | An | An | Ph₂CH | Me | Cl | Pd |
| 138 | 2,6-t-BuPh | a | a | 2,6-t-BuPh | Me | Me | Pd |
| 139 | 2,6-t-BuPh | Me | Me | 2,6-t-BuPh | Me | Me | Pd |
| 140 | 2,6-t-BuPh | H | H | 2,6-t-BuPh | Me | Me | Pd |
| 141 | 2,6-t-BuPh | An | An | 2,6-t-BuPh | Me | Me | Pd |
| 142 | 2,6-t-BuPh | a | a | 2,6-t-BuPh | Me | Cl | Pd |
| 143 | 2,6-t-BuPh | Me | Me | 2,6-t-BuPh | Me | Cl | Pd |
| 144 | 2,6-t-BuPh | H | H | 2,6-t-BuPh | Me | Cl | Pd |
| 145 | 2,6-t-BuPh | An | An | 2,6-t-BuPh | Me | Cl | Pd |
| 146 | 2-t-BuPh | H | H | 2-t-BuPh | Br | Br | Ni |
| 147 | 2-t-BuPh | Me | Me | 2-t-BuPh | Br | Br | Ni |
| 148 | 2-t-BuPh | An | An | 2-t-BuPh | Br | Br | Ni |
| 149 | 2-6-t-BuPh | H | H | 2-6-t-BuPh | Br | Br | Ni |
| 150 | 2-6-t-BuPh | Me | Me | 2-6-t-BuPh | Br | Br | Ni |
| 151 | 2-6-t-BuPh | An | An | 2-6-t-BuPh | Br | Br | Ni |
| 152 | Ph | H | H | Ph | Br | Br | Ni |
| 153 | Ph | Me | Me | Ph | Br | Br | Ni |
| 154 | Ph | An | An | Ph | Br | Br | Ni |
| 155 | 2-PhPh | H | H | 2-PhPh | Br | Br | Ni |
| 156 | 2-PhPh | Me | Me | 2-PhPh | Br | Br | Ni |
| 157 | 2-PhPh | An | An | 2-PhPh | Br | Br | Ni |
| 158 | 2-i-Pr-6-MePh | H | H | 2-i-Pr-6-MePh | Br | Br | Ni |
| 159 | 2-i-Pr-6-MePh | Me | Me | 2-i-Pr-6-MePh | Br | Br | Ni |
| 160 | 2-i-Pr-6-MePh | An | An | 2-i-Pr-6-MePh | Br | Br | Ni |
| 161 | 2,5-t-BuPPh | H | H | 2,5-t-BuPPh | Br | Br | Ni |
| 162 | 2,5-t-BuPPh | Me | Me | 2,5-t-BuPPh | Br | Br | Ni |
| 163 | 2,5-t-BuPPh | An | An | 2,5-t-BuPPh | Br | Br | Ni |
| 164 | 2,6-EtPh | H | H | 2,6-EtPh | Br | Br | Ni |
| 165 | 2,6-EtPh | Me | Me | 2,6-EtPh | Br | Br | Ni |
| 166 | 2,6-EtPh | An | An | 2,6-EtPh | Br | Br | Ni |
| 167 | 1-Np | H | H | 1-Np | Br | Br | Ni |
| 168 | 1-Np | Me | Me | 1-Np | Br | Br | Ni |
| 169 | 1-Np | An | An | 1-Np | Br | Br | Ni |
| 170 | Ph | Ph | Ph | Ph | Br | Br | Ni |
| 171 | 2,4,6-MePh | H | H | 2,4,6-MePh | Br | Br | Ni |
| 172 | 2,4,6-MePh | Me | Me | 2,4,6-MePh | Br | Br | Ni |
| 173 | 2,4,6-MePh | An | An | 2,4,6-MePh | Br | Br | Ni |
| 174 | 2,4,6-MePh | Ph | Ph | 2,4,6-MePh | Br | Br | Ni |

Note—In Table II, above, the following convention and abbreviations are used. For $R^3$ and $R^6$, when a substituted phenyl ring is present, the amount of substitution is indicated by the number of numbers indicating positions on the phenyl ring, as, for example, 2,6-i-PrPh represents 2,6-diisopropyl phenyl; i Pr=isopropyl; Me=methyl; Et=ethyl; t-butyl=tert-butyl; Ph=phenyl; Np=naphthyl; An=1,8-naphthalene; a is the group —C(Me)₂—CH₂—C(Me)₂—; and b is the group —(CH₂)₃CO₂Me. Note further that the (b) groups depicted in Tables III and IV are also applicable to Table II.

The tridentate compounds IV useful in forming the Cation Component of the present catalyst composition by reaction with the above described Precursor Ion Pair may, for example, be presented as compounds of the formula:

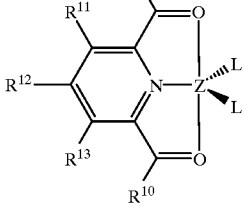

IVa

IVb wherein:

$R^7$ and $R^8$ are each independently selected from an unsubstituted or substituted aryl group wherein said subtitution is an alkyl or a functional group which is inert with respect to the contemplated polymerization;

$R^9$ and $R^{10}$ are each independently selected from hydrogen, an unsubstituted or substituted $C_1$–$C_{20}$ (preferably $C_1$–$C_6$) hydrocarbyl as, for example, alkyl (methyl, ethyl, propyl, pentyl and the like); aryl (phenyl, toluyl and the like) or a functional group which is inert with respect to the polymerization (e.g., nitro, halo and the like);

$R^{11}$, $R^{12}$, and $R^{13}$ are each independently selected from hydrogen, an unsubstituted or substituted $C_1$–$C_{20}$ hydrocarbyl or an inert functional group, all as described above for $R^9$;

Further, it is understood that in those instances where a hetero atom A (e.g., oxygen, nitrogen) of a tridentate compound has only a single covalent bond to the hydrocarbylene moiety of said compound, the hetero atom has an additional R group bonded thereto and such R group is independently selected from the above groups represented by $R^9$;

Z is a transition metal, preferably Fe(II) or Fe(III); and each L is independently selected from a halogen such as chlorine, bromine, iodine or a $C_1$–$C_8$ (preferably $C_1$–$C_5$) alkyl or both L groups, together in combination, represent an unsubstituted or substituted, saturated or unsaturated, hydrocarbylene group which together with Z forms a cyclic group, preferably a 3 to 7, most preferably 3 to 5 member ring cyclic group.

Preferred compounds of IV are those wherein each $R^{11}$, $R^{12}$ and $R^{13}$ are hydrogen; and $R^9$ and $R^{10}$ are each independently selected from halogen, hydrogen or a $C_1$–$C_6$ alkyl, preferably each is independently selected from methyl or hydrogen; and wherein $R^7$ and $R^8$ of IVa are each an aryl or substituted aryl group, preferably wherein the aryl contains substitution in the 2 position, the 2,6 positions or the 2,4,6 positions which is selected from a $C_1$–$C_6$ (most preferably $C_1$–$C_3$) alkyl and the remaining positions are each independently selected from hydrogen (most preferred), halogen or a $C_1$–$C_6$ (preferably $C_1$–$C_3$) alkyl.

Illustrative of tridentate compounds which are useful in providing the catalyst composition of the present invention are compounds of Formula IVa as having the combination of groups shown in Table III below:

TABLE III

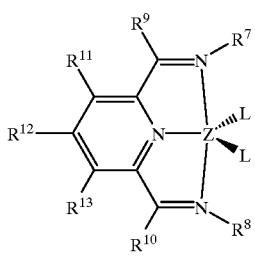

IVa

| $R^7/R^8$ Each | $R^9$ | $R^{10}$ | $R^{11}$ | $R^{12}$ | $R^{13}$ | Z | L |
|---|---|---|---|---|---|---|---|
| 2,6-diisopropylphenyl | Me | Me | H | H | H | Fe | * |
| 2,6-diisopropylphenyl | Me | Me | H | H | H | Fe | * |
| (2-tertbutyl)phenyl | Me | Me | H | H | H | Fe | * |
| phenyl | Me | Me | H | H | H | Fe | * |
| 2,6-diisopropylphenyl | Me | Me | H | Me | H | Fe | * |
| 2,6-diisopropylphenyl | Me | Me | H | Me | H | Fe | * |
| (2-tertbutyl)phenyl | Me | Me | H | Me | H | Fe | * |
| phenyl | Me | Me | H | Me | H | Fe | * |
| 2,6-diisopropylphenyl | Me | Me | Me | Me | Me | Fe | * |
| 2,6-diisopropylphenyl | Me | Me | Me | Me | Me | Fe | * |
| (2-tertbutyl)phenyl | Me | Me | Me | Me | Me | Fe | * |
| phenyl | Me | Me | Me | Me | Me | Fe | * |
| 2,4,6-trimethylphenyl | Me | Me | H | H | H | Fe | * |
| 2,3,4,5,6-pentamethylphenyl | Me | Me | H | H | H | Fe | * |
| (2-t-butyldimethylsiloxyl)benzyl | Me | Me | H | H | H | Fe | * |
| (2-trimethylsiloxyl)benzyl | Me | Me | H | H | H | Fe | * |
| (2-phenyldimethylsiloxyl)benzyl | Me | Me | H | H | H | Fe | * |
| (2-phenylmethylsiloxyl)benzyl | Me | Me | H | H | H | Fe | * |
| (2-dimethylsiloxyl)benzyl | Me | Me | H | H | H | Fe | * |
| 2,6-diisopropylphenyl | Me | Me | H | H | H | Co | * |
| 2,6-diisopropylphenyl | Me | Me | H | H | H | Co | * |
| (2-tertbutyl)phenyl | Me | Me | H | H | H | Co | * |
| phenyl | Me | Me | H | H | H | Co | * |
| 2,6-diisopropylphenyl | Me | Me | H | Me | H | Co | * |
| 2,6-diisopropylphenyl | Me | Me | H | Me | H | Co | * |
| (2-tertbutyl)phenyl | Me | Me | H | Me | H | Co | * |
| phenyl | Me | Me | H | Me | H | Co | * |
| 2,6-diisopropylphenyl | Me | Me | Me | Me | Me | Co | * |
| 2,6-diisopropylphenyl | Me | Me | Me | Me | Me | Co | * |
| (2-tertbutyl)phenyl | Me | Me | Me | Me | Me | Co | * |
| phenyl | Me | Me | Me | Me | Me | Co | * |
| 2,4,6-trimethylphenyl | Me | Me | H | H | H | Co | * |
| 2,3,4,5,6-pentamethylphenyl | Me | Me | H | H | H | Co | * |
| (2-t-butyldimethylsiloxyl)benzyl | Me | Me | H | H | H | Co | * |
| 2-methylphenyl | Me | Me | H | H | H | Fe | * |
| (2-trimethylsiloxyl)benzyl | Me | Me | H | H | H | Co | * |
| (2-phenyldimethylsiloxyl)benzyl | Me | Me | H | H | H | Co | * |
| (2-phenylmethylsiloxyl)benzyl | Me | Me | H | H | H | Co | * |
| (2-dimethylsiloxyl)benzyl | Me | Me | H | H | H | Co | * |

The asterisk (*) in Table III above represents both anionic ligand groups (L) of the above preferred tridentate compounds IV(a) and for each of the above compounds both L groups are, respectively, chlorine; bromine; methyl (—$CH_3$); ethyl (—$C_2H_5$); propyl (—$C_3H_5$, each of the isomers); butyl (—$C_4H_9$, each of the isomers); dimethylamine; 1,3-butadiene-1,4 diyl; 1,4-pentadiene-1,5 diyl; $C_4$ alkylene; and $C_5$ alkylene.

Further, illustrative of tridentate compounds of Formula IVb which are useful in providing the catalyst composition of the present invention are given in Table IV below. Further, suitable (L) groups for Tables III and IV also include those depicted at Table II above.

TABLE IV

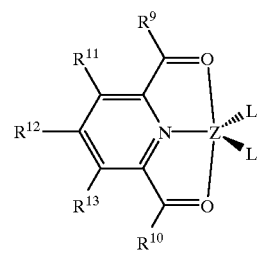

IVb

| $R^9$ | $R^{10}$ | $R^{11}$ | $R^{12}$ | $R^{13}$ | Z | L |
|---|---|---|---|---|---|---|
| Me | Me | H | H | H | Fe | * |
| Me | Me | H | Me | H | Fe | * |
| i-Pr | i-Pr | H | H | H | Fe | * |
| i-Pr | i-Pr | H | Me | H | Fe | * |
| i-Pr | i-Pr | Me | Me | Me | Fe | * |
| Ph | Ph | H | H | H | Fe | * |
| Ph | Ph | H | Me | H | Fe | * |
| Me | Me | H | H | H | Co | * |
| Me | Me | H | Me | H | Co | * |
| i-Pr | i-Pr | H | H | H | Co | * |
| i-Pr | i-Pr | H | Me | H | Co | * |
| i-Pr | i-Pr | Me | Me | Me | Co | * |
| Ph | Ph | H | H | H | Co | * |
| Ph | Ph | H | Me | H | Co | * |

The asterisk (*) in Table IV above represents both anionic ligand groups of the above preferred tridentate compounds IV(a) and for each of the above compounds both L groups are, respectively, chlorine; bromine; methyl (—$CH_3$); ethyl (—$C_2H_5$); propyl (—$C_3H_5$, each of the isomers); butyl (—$C_4H_9$, each of the isomers); dimethylamine; 1,3-butadiene-1,4-diyl, 1,4-pentadiene-1,5-diyl; $C_4$ alkylene and $C_5$ alkylene.

One preferred embodiment comprises using transition metal compound III or IV wherein each L group is a halogen atom. In this embodiment the active catalyst composition will typically be employed in conjunction with a trihydrocarbyl aluminum as a scavenger agent and/or an alkylating agent whereby the halogen initially constituting L is replaced by the hydrocarbyl group of the aluminum compound. Thus, at least one of the halogens constituting L becomes a new hydrocarbyl L group derived from the aluminum compound. Each hydrocarbyl group of the aluminum compound is independently selected from a $C_1$–$C_{20}$ hydrocarbyl, or a $C_1$–$C_{20}$ hydrocarbyloxy, preferably a $C_1$–$C_{20}$ hydrocarbyl and most preferably a $C_1$–$C_4$ hydrocarbyl group. Examples of such groups include alkyl and alkoxy groups such as methyl, methoxy, ethyl, ethoxy, propyl (all isomers), propoxy (all isomers), butyl (all isomers), butoxy (all isomers), and the like as well as aryl, such as benzyl, phenyl and the like.

When a transition metal compound III or IV is used to form the subject composition and at least one L group of compound III or IV is a halogen, the amount of trihydrocarbyl aluminum will typically be sufficient to provide a molar ratio of Al to halogen of from 2 to 1000, preferably from 10 to 500 and most preferably from 20 to 400.

When at least one L of the transition metal compounds is halogen, the transition metal compound III or IV and the Precursor Ion Pair can be mixed in an inert diluent prior to, simultaneously with, or after contact with the hydrocarbyl aluminum.

In a second preferred embodiment wherein each L of the transition metal compound is a hydrocarbyl, a hydrocarbylene or a hydrocarbyloxy group, there is no need for the addition or handling of an aluminum alkyl or aluminum alkoxy compound. Thus, the catalyst composition can be readily formed and used. The Z to M molar ratio of bidentate or tridentate transition metal compound to the Precursor Ion Pair, respectively, should be from 0.01 to 100, preferably from 0.1 to 4.

The catalyst composition of the present invention can be prepared by combining the Precursor Ion Pair with the bidentate or tridentate transition metal compound III and/or IV and, where appropriate, the optional aluminum compound, in any order. The Precursor Ion Pair can be first mixed with the transition metal compound and then at any desired time prior to use, the aluminum compound can be added. The Precursor Ion Pair I and the transition metal compound III and/or IV are combined in a suitable liquid diluent, such as an aliphatic or aromatic hydrocarbon to form a slurry. The temperature, pressure, and contact time of this treatment are not critical, but generally vary from −20° C. to 150° C., from 1 Pa to 10,000 MPa, more preferably at atmospheric pressure (100 kPa), for 5 minutes to 48 hours. Usually the slurry is agitated.

The mixture of I and III and/or IV can be maintained in the diluent or solvent or can be stored as a solid particulate material by diluent/solvent removal. The diluent/solvent can be any inert (to chemical reaction with the components I, III and IV, as appropriate) liquid such as a hydrocarbon liquid, preferably a $C_5$–$C_{10}$ aliphatic or cycloaliphatic hydrocarbon or a $C_6$–$C_{10}$ aromatic hydrocarbon. The components can be contacted and stored at any temperature provided it is below the decomposition temperature of the bidentate or tridentate transition metal compound and of the Precursor Ion Pair. Normally temperatures of from 0° to 100° C. are acceptable. All steps should be conducted under substantially anaerobic and anhydrous conditions.

In the embodiment wherein each L is selected from a hydrocarbyl, a hydrocarbyloxy or both L groups together with Z form a cyclic group, the L group is sufficiently labile under reaction conditions to be removed by the Precursor Cation (e.g., Brønsted acid of the Precursor Ion Pair). Thus, the transition metal compound is ionized by the Precursor Cation to form the Cation Component of the catalyst composition. The Cation Component is stabilized as a highly active catalyst site by the Precursor Anion which is now (as part of the Catalyst Composition) referred to as the Anion Component.

In the alternate embodiment wherein at least one (and more often both) L group of the bidentate III and tridentate IV is a halogen atom, the presence of a tri ($C_1$–$C_{20}$ hydrocarbyl) aluminum compound, as described above, provides the means for in situ substitution of the halogen(s) of the transition metal compound by hydrocarbyl group(s), as appropriate, and form a halo hydrocarbyl aluminum by-product ($AlR_nX_{3-n}$, where n is 1 or 2). The resulting hydrocarbyl L group of the transition metal compound remains sufficiently labile to proceed in the manner described above where L was initially a hydrocarbyl, hydrocarbylene or hydrocarbyloxy group.

Finally, the catalyst composition can be formed in situ in the polymerization reaction zone. The precursor components can be introduced into the reaction zone in any order to provide the subject catalyst composition. Thus, the Precursor Ion Pair (I), the bidentate or tridentate transition metal compound III and/or IV and, where appropriate, the trialkyl aluminum can be introduced into the polymerization reaction zone in any order or combination. These ingredients will combine therein to provide the present catalyst composition.

Thus, the resultant active catalyst composition of the present invention comprises a Cationic Component (a cationic transition metal bidentate or tridentate moiety) and an Anion Component (an anionic metalloid silane modified inorganic oxide macromolecule). This active catalyst can be represented by the general formula:

$$T\text{—}[\text{—SiR'R''ODM(Q)}_3]^{a-}{}_n[\text{Cat}]^{b+}{}_m \qquad V$$

wherein

Cat represents the Cationic Component derived from the transition metal bidentate compound III and/or tridentate compound IV wherein only one L group is pendent from the transition metal atom thereof;

"n" and "m" represent integers;

"a" and "b" represent integers of 1, 2 or 3 such that the product of (a) times (n) is substantially equal (e.g., ±10%) to the product of (b) times (m); and Si,R',R",O,D,M,Q, and T, each have the same definition as described with respect to formula I above.

The by-products (e.g., Precursor Cation non-ionic remnant, non-ionic remnants of L) of mixing the Precursor Ion Pair and the Cation Component starting material and, optionally, the aluminum hydrocarbyl, can be left in the reaction mixture but preferably are removed by washing.

The catalyst composition of the present invention comprises the unique combination of bidentate or tridentate cation, described herein above, activated and stabilized by the Anion Component described herein above and, preferably where appropriate (when at least one L of the starting transition metal compounds III and/or IV is a halogen), of an aluminum alkyl or alkoxy adjunct to the catalyst composition. It is believed, though not meant to be a limitation of the invention as taught herein and defined by the claims appended hereto, that the presently required Anion Component provides a unique combination with the Cation Component because of their structure. The inorganic oxide support (T) is preferably substantially free of hydroxyl groups as these groups have been consumed in the initial reaction with a silane and, optionally, alkyl aluminum compound. The silane provides a means of further linking the support to a metalloid via a sterically bulky hydrocarbyl group. This bulky group is believed to act as a spacer and a shield whereby the oxygen atoms presented by the inorganic oxide and those adjacent to the silane (—OSiR'R"—O—) do not interfere with and, instead, contribute to the catalytic activity of the catalyst composition. Still further, as described above, the Anion Component of the present catalyst composition is formed by a coupling of a silane hydrogen with a hydroxyl group of the metalloid containing reactant. Under this process no halogen containing by-product is produced and, thereby, contained in the resultant Anion Component which may poison the polymerization.

The catalysts of the present invention may be used in addition polymerization processes wherein one or more monomers are contacted with the heterogeneous catalyst composition of the present invention under addition polymerization conditions.

Suitable addition polymerizable monomers include ethylenically unsaturated monomers, acetylenic compounds, conjugated or non-conjugated dienes, and polyenes. Preferred monomers include olefins, for example alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene or combinations thereof, as well as long chain vinyl terminated oligomeric or polymeric reaction products formed during the polymerization and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1, 1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In addition, the polymerization monomers may include functionalized ethylenically unsaturated monomers wherein the functional group is selected from hydroxyl, carboxylic acid, carboxylic acid esters, acetates, ethers, amides, amines and the like.

The catalyst composition can be formed in situ in the polymerization zone by separately or concurrently introducing each component described above into the zone or can be preformed and introduced into the reaction zone. The supported catalyst composition can be advantageously employed in a high pressure, solution, slurry or gas phase polymerization process. A high pressure process is usually carried out at temperatures from 100 to 400° C. and at pressures above 500 bar. A slurry process typically uses an inert hydrocarbon diluent and temperatures of from 0° C. up to a temperature just below the temperature at which the resulting polymer becomes substantially soluble in the inert polymerization medium. Preferred temperatures are from 40° C. to 115° C. The solution process is carried out at temperatures from the temperature at which the resulting polymer is soluble in an inert solvent up to 275° C., preferably at temperatures of from 130° C. to 260° C., more preferably from 150° C. to 240° C. Preferred inert solvents are $C_{1-20}$ hydrocarbons and preferably $C_{5-10}$ aliphatic hydrocarbons, including mixtures thereof. The solution and slurry processes are usually carried out at pressures between 100 kPa to 10 MPa. Typical operating conditions for gas phase polymerizations are from 20 to 100° C., more preferably from 40 to 80° C. In gas phase processes the pressure is typically from 10 kPa to 10 MPa. Condensed monomer or diluent may be injected into the reactor to assist in heat removal by means of latent heat of vaporization.

When used in gas phase polymerization processes, the present heterogeneous catalyst composition preferably has a median particle diameter from 20 to 200 μm, more preferably from 30 μm to 150 μm, and most preferably from 50 μm to 100 μm. When used in slurry polymerization processes, the subject heterogeneous catalyst composition preferably has a median particle diameter from 1 to 200 μm, more preferably from 1 μm to 100 μm (e.g., 1 to 80), and most preferably from 1 μm to 50 μm (e.g., 1–20). When used in solution or high pressure polymerization processes, the subject heterogeneous catalyst composition preferably has a median particle diameter from 1 to 40 μm, more preferably from 1 μm to 30 μm, and most preferably from 1 μm to 20 μm.

In the polymerization process of the present invention, scavengers may be used which serve to protect the supported catalyst from catalyst poisons such as water, or oxygen. These scavengers are generally used in varying amounts depending on the amounts of impurities in the polymerization reaction zone. Preferred scavengers include the aforementioned organoaluminum compounds of the formula $Al(R)_3$ or alumoxanes.

In the present polymerization process, molecular weight control agents as can also be used. Examples of such molecular weight control agents include hydrogen, trialkyl aluminum compounds or other known chain transfer agents. A particular benefit of the use of the present supported catalysts is the ability (depending on reaction conditions) to produce desired molecular weight distribution (α-olefin homopolymers and copolymers. Preferred polymers have polydispersity (Mw/Mn) of greater than 3, more preferably greater than 5. Such molecular weight distribution polymer products, especially those from a slurry process are highly desirable due to their ease of processing into films, articles and the like.

The terms "surface area" (SA) and "pore volume" (PV) refer herein to the specific surface area and pore volume determined by nitrogen adsorption using the B.E.T. technique as described by S. Brunauer, P. Emmett, and F. Teller in Journal of the American Chemical Society, 60, pp. 209–319 (1939).

The term "average particle size" (APS) refers to the average particle diameter of a sample of particles determined by a Mastersizer unit from Malvern, which operates on the principle of laser light diffraction and is known to all familiar in the art of small particle analysis.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification of claims, such as that representing a particular set of properties, carbon number, conditions, physical states or percentages, is intended to literally incorporate expressly herein any number falling within such range, including any subset of numbers within any range so recited.

EXAMPLE 1

Synthesis of Silane-modified Silica

Several different silicas were employed as porous inorganic oxide component (T) in forming catalyst compositions of the present invention. Each silica had an average particle size (APS) of not greater than 100 microns, a surface area (SA) in the range of 50 to 800 m²/g and a pore volume (PV) of 0.2 to 3 cc/g. The silicas used herein below were: Silica A (uncalcined, 50 μm APS, 300 m²/g SA, 1.6 cc/g PV). Silica B (uncalcined, 12 μm APS, 300 m²/g SA, 1.6 cc/g PV). Silica C (pre-calcined, 12 μm APS, 300 m²/g SA, 1.6 cc/g PV). Silica D (uncalcined, 6 μm APS, 300 m²/g SA, 1.6 cc/g PV). Silica E (uncalcined, 42 μm APS, 600 m²/g SA, 1.3 cc/g PV). Silica F (uncalcined, 10 μm APS, 512 m²/g SA, 1.62 cc/g PV). Each of the above inorganic oxide materials was heated in a muffle-oven under argon atmosphere at varying temperatures of from 200° C. to 800° C. for 4 hours just prior to use below.

i) Preparation of Phenylsilane-modified Silica, PhH$_2$Si-OSi≡

A pentane (150 ml) slurry of Silica A (calcined at 800° C.; 0.5 mmol —OH/g, 20.0 g) was treated with PhSiH$_3$ (6 ml; 0.048 mol) and NEt$_3$ (6 ml; 0.043 mol) under argon atmosphere at room temperature. Hydrogen gas vigorously evolved from the solution. The resulting mixture was agitated in a shaker for 12 hr. The phenylsilane-modified silica was collected on a fritted filter under argon, washed with pentane (5×20 ml), and dried in vacuo. Yield: 20.95 g. Diffuse Reflectance Infrared Fourier Transform Spectroscopy (DRIFTS): ν (Si—H) 2178 cm$^{-1}$ (vs). $^{29}$Si Cross Polarization Magic Angle Spectroscopy (CPMAS): δ −23 ppm.

Using the same procedures as above, a series of samples of Silicas A, B, C, D, E and F, were each subjected to different calcination temperatures (800, 700, 600, 500, 400, 300, 200° C.) and then were employed to prepare phenylsilane-modified silica products in the manner described above. Each of the formed phenylsilane-modified silica products had the same DRIFTS and $^{29}$Si CPMAS, as given above.

ii) Preparation of Dimethylsilane-modified Silica, Me$_2$HSi—OSi≡

A pentane (200 ml) slurry of Silica A (800° C.; 0.5 mmol —OH/g, 30.0 g) was treated with (Me$_2$HSi)NH (3.0 g; 22.5 mmol). The resulting mixture was agitated in a shaker at RT for 12 h. The dimethylsilane-modified silica product was collected on a fritted filter under argon, washed with pentane (5×20 ml), and dried in vacuo. Yield: 30.95 g. DRIFTS IR: ν (Si—H) 2158 cm$^{-1}$ (s). $^{29}$Si CPMAS: δ −1.3 ppm.

Additional Silica A samples as well as samples of Silica B, C, D, E and F, each calcined at temperatures 200, 300, 400, 500, 600, 700 and 800° C. for 4 hours, were treated as described above to yield dimethylsilane modified silica products. Each had the same DRIFTS and $^{29}$Si CPMAS values as given above.

iii) Synthesis of Alkyl Aluminum-treated Silane-modified Silica

A heptane (200 ml) slurry of phenylsilane silica (10 g) formed according to Example I(i), PhH$_2$Si-OSi≡ (Silica C) calcined at 400° C., was treated with AlBu$_3$ (20 ml, 1M in toluene) at room temperature. The resulting mixture was agitated in a shaker for 12 h and was then filtered, washed with pentane (3×50 ml), and dried in vacuo. Yield: 11.3 g. DRIFTS: ν (Si—H) 2170 cm$^{-1}$ (m). $^{29}$Si CPMAS: δ −24 ppm.

The above procedure was repeated except that a dimethylsilane silica formed according to Example I(ii) above was used in lieu of the phenylsilane silica. The yield was about 11 g. The DRAFTS was 2158 cm$^{-1}$ and $^{29}$Si CPMAS δ −1.3 ppm.

EXAMPLE 2

Synthesis of Hydroxy Metalloid i). Synthesis of BrC$_6$H$_4$—C$_6$H$_4$-p-OSiMe$_3$ 1,1,3,3-hexamethyldisilazne (75 ml; 98%; 0.348 mol) was added to BrC$_6$H$_4$—C$_6$H$_4$-p-OH (30 g; 0.117 mol) and heated at reflux for 4 h. After cooling to room temperature, the resultant solid product was filtered off and dried. The dried crude product was then dissolved in Et$_2$O and eluted down a ~2 inch pad of silica column (Grace 948 silica, calcined at 800° C.). White crystalline solid was obtained after evaporation of the eluted ether solution. Yield: 33.6 g (89%).

ii). Synthesis of MgBrC$_6$H$_4$—C$_6$H$_4$-p-OSiMe$_3$

Magnesium powder (50 mesh; 0.47 g; 19.3 mmol) was mixed with THF (5 ml) in a 3-necked flask. 1,2-dibromoethane (0.25 ml; 2.87 mmol) was then introduced into the flask and the mixture heated to reflux. A THF solution (11 ml) of BrC$_6$H$_4$—C$_6$H$_4$-p-OSiMe$_3$ (3.0 g; 9.34 mmol) was added dropwise through a syringe over a period of 20 min period and was refluxed for 1 h. The resulting dark gray solution was decanted and a 0.5 ml aliquot solution was titrated with 2-butanol in the presence of 5-methyl-1,10-phenanthroline. Yield: 87% (0.76 M, 10.9 ml).

iii). Synthesis of [MgBr•2THF][(C$_6$F$_5$)$_3$B(C$_6$H$_4$—C$_6$H$_4$-p-OSiMe$_3$)]

An isopar solution of B(C$_6$F$_5$)$_3$ (3.23 wt%; 8.13 mmol) was treated with freshly prepared MgBrC$_6$H$_4$—C$_6$H$_4$-p-OSiMe$_3$ (10.4 ml; 0.76 M; 8.13 mmol) at room temperature. The resulting mixture was stirred overnight to give a solution having a brown syrup material at the bottom of the reaction flask. After decanting the supernatant solution, this brown viscous syrup was then evaporated overnight to yield a brownish solid product. Yield: 6.84 g (84%).

iv). Synthesis of [PhMe$_2$NH][(C$_6$F$_5$)$_3$B(C$_6$H$_4$—C$_6$H$_4$-p-OH)]

[MgBr•2THF][(C$_6$F$_5$)$_3$B (C$_6$H$_4$—C$_6$H$_4$-p-OSiMe$_3$)] (22 g; 21.2 mmol) and aqueous NMe$_2$Ph•HCl solution (100 ml; 0.312 M; 31.2 mmol) were stirred at room temperature for about 15 hours. The resulting H$_2$O solution was carefully decanted and the viscous solid was washed with distilled H$_2$O (6×150 ml), rinsed with pentane (3×100 ml) and then dried in vacuo. Yield: 13.2 g (76%).

EXAMPLE 3

Preparation of the Silica-tethered Anilinium Borate Precursor Ion Pair, [PhMe$_2$NR][(C$_6$F$_5$)$_3$B(C$_6$H$_4$—C$_6$H$_4$-p-O—SiPhH-]OSi≡ ("SAB")

Method i) Ether (200 ml) slurries of phenylsilane silicas (10.0 g), formed with Silicas A, B, C, D, E and F, respectively which were each calcined at 400° C. according to Example I(i) above, were each treated with [PhMe$_2$NH][(C$_6$F$_5$)$_3$B(C$_6$H$_4$—C$_6$H$_4$-p-OH)] (3.01 g; 3.75 mmol) at room temperature under argon atmosphere. The solutions were agitated in dry box for 2 days and the resulting white solid products were filtered off, washed with ether (3×50 ml) and pentane (3×10 ml), and dried in vacuo. Yield: ~11.25 g.

The above procedure was repeated using the triisobutylaluminum treated phenylsilane-silica formed according to Example I(iii) in lieu of the above phenyl silane silicas to form an SAB product.

Method ii) Toluene (200 ml) slurries of triisobutylaluminum-treated phenylsilane silica (10 grams) formed according to Example I(iii) with Silica A, B, C, D, E and F, respectively, which were calcined at 400° C. were each treated with [PhMe$_2$NH][(C$_6$F$_5$)$_3$B(C$_6$H$_4$—C$_6$H$_4$-p-OH)] (3.01 g) at room temperature under argon atmosphere. The reaction mixtures were then heated and maintained at 70° C. for ~3 h. The resulting mixtures were filtered off at 70° C., washed with toluene at 70° C., and dried in vacuo at 50° C. for at least 3 h. Yield: 11.25 g.

The above procedure was repeated except that the phenylsilane silica formed according to Example I(ii) was used in lieu of the above phenylsilane silica to produce an SAB.

EXAMPLE 4

Synthesis of Fully-formulated Tridentate Iron Catalyst Composition

An alkylaluminum-containing (Al$^i$Bu$_3$) heptane solution was treated with a tridentate iron catalyst, 2,6-bis[1-(2,4,6- trimethylphenylimino)ethyl] pyridine iron dichloride, which was then treated with different SAB Precursor Ion Pairs indicated in Table V below. The resulting catalyst solutions were agitated in a shaker for 3–12 h and then filtered, washed with toluene and then with heptane, and dried in vacuo at RT under argon. Each formed activated heterogeneous iron polyolefin catalyst composition was analyzed by ICP-AES (Inductive Coupled Plasma-Atomic Emission Spectroscopy) to determine the boron and iron weight %. The results are given in Table V below.

TABLE V

| Sample # | Al$^i$Bu$_3$ Conc (mmol/ml C$_7$H$_{16}$) | Cation Component Starting Material (CC) | Precursor Ion Pair | Fe wt % | B wt % |
|---|---|---|---|---|---|
| 1 | 1/75 | 2 | A | 0.46 | 0.17 |
| 2 | 1/50 | 2 | A | 0.50 | 0.18 |
| 3 | 1/50 | 2 | B | 0.19 | 0.16 |
| 4 | 1/50 | 2 | C | 0.41 | 0.18 |
| 5 | 1/25 | 2 | D | 0.41 | 0.24 |
| 6 | 1/25 | 2 | D | 0.52 | 0.18 |

CC 2 = 2,6-bis[1-(2,4,6-trimethylphenylimino)ethyl]pyridine iron dichloride
PIP-A: was prepared according to Example 3 ii) except using Silica D
PIP-B: was prepared according to Example 3 ii) using Silica A
PIP-C: was prepared according to Example 3 ii) except using Silica E
PIP-D: was prepared according to Example 3 i) except using triisobutyl aluminum treated phenylsilane silica of Example I(iii).

EXAMPLE 5

Synthesis of Fully Formulated Tridentate Iron Catalyst Composition

Several heterogeneous solid catalyst composition products were produced using an iron tridentate and a Precursor Ion Pair derived from silica tethered anilinium borate (SAB).

1. A 100 ml toluene solution containing 1 mmole triisobutylaluminum and 0.076 mmole (40 mg) of 2,6-bis[1-(2,4,6-trimethylphenylimethyl] pyridine iron dichloride was formed at room temperature under an argon atomosphere. 800 mg of Precursor Ion Pair (formed according to Example 3(i) using a triisobutylaluminum treated phenylsilane silica of Silica B) was introduced into the toluene solution at room temperature followed by 2 hours of mixing. The brown solid product was then separated by filtration, washed with toluene (2×15 ml) followed by washing with heptane (2×10 ml) under argon atmosphere. The resultant product was dried in vacuo. Yield: 0.815 g. Labeled FTI-1.
2. The procedure above was repeated except that the tridentate and Precursor Ion Pair were allowed to react for 4 hours prior to separation and washing. This product was labeled FFI-2.
3. The procedure above was repeated except that heptane was used as the solvent instead of toluene. This product wag labeled FTI-3.

EXAMPLE 6

Polymerization Method

Each polymerization was carried out in a 2 liter autoclave reactor 5-which was evacuated at the predetermined temperature desired for polymerization reaction for 90 min prior to use.

Method A. An alkyl aluminum pretreated heptane (~200 ml) solution with a known amount of Al$^i$Bu$_3$ (1.0 M in toluene) was injected to the reactor. Another heptane solution (~200 ml) of Cation Component and Anion Component mixture was then injected to the reactor. While stirring at 500 rpm, ethylene gas was rapidly introduced into the reactor until it provided the desired polymerization pressure. The polymerization temperature was controlled via a recirculating water bath. Ethylene was fed on demand via a mass flow controller to maintain the pressure.

Method B. An alkyl aluminum pretreated heptane (~300 ml) solution with a known amount of Al$^i$Bu$_3$ (1.0 M in toluene) was first mixed with the Cation Component and the Anion Component. The resulting catalyst mixture was then injected into the reactor. While stirring at 500 rpm, ethylene gas was rapidly introduced into the reactor and set at the desired polymerization pressure. The polymerization temperature was controlled via a recirculating water bath. Ethylene was fed on demand via a mass flow controller.

Polymerization of Ethylene

1. Polymerization of ethylene was conducted using the methods A and B. The catalyst compositions were derived from mixing a tridentate Cation Component starting material selected from either 2,6-bis[1-(2,6-diisopropylphenylimino)ethyl] pyridine iron dichloride (Catalyst "1") or 2,6-bis[1-(2,4,6-trimethylphenylimino)ethyl] pyridine iron dichloride (Catalyst "2") with the SAB Precursor Ion Pair formed according to the method of Example 3(ii) using Silica D. The polymerization was carried out for 30 minutes with runs of Method A and for 60 minutes with runs of Method B.

The condition and results of each reaction is given in Table VI below.

TABLE VI

| Cat | Poly Method | P (psig) | Temp (° C.) | Al/Fe | B/Fe | HLMI | Mw | PDI | Cat Act. (g/g-Cat-h) | Fe Act. (g/g-Fe-h) |
|---|---|---|---|---|---|---|---|---|---|---|
| 1 | A | 180 | 50 | 195 | 1.1 | 0.41 | 530,000 | 5.6 | 1,680 | $1.7 \times 10^5$ |
| 1 | A | 200 | 50 | 200 | 0.8 | 0.91 | 456,000 | 5.5 | 2,060 | $1.6 \times 10^5$ |
| 2 | B | 200 | 60 | 36 | 1.1 | 4.22 | na | na | 4,650 | $4.8 \times 10^5$ |
| 2 | B | 200 | 50 | 58 | 1.1 | na | 265,000 | 8.6 | 4,520 | $4.4 \times 10^5$ |

HLMI = high load melt index
PDI = Polydispersity index

2. Polymerization of ethylene was conducted using the method B of Example 6 described above except that the catalyst composition was preformed composition formed according to Example 4 above. The reaction pressure was maintained at 200 psig and the polymerization was carried out for 1 hour. The fully formulated catalyst compositions Sample Nos. 1 and 2 of Example 4, Table I were used in the polymerizations given in Table VII below.

TABLE VII

| Catalyst Composition Sample # | Al$^i$Bu$_3$ μmol | Temp (° C.) | M$_w$ (g/mol) | PDI | B.D.* (g/c.c) | Fe Act. (gPE/gFe-h) | Cat Act. (gPE/gCat-h) |
|---|---|---|---|---|---|---|---|
| 2 | 200 | 75 | 312k | 9.7 | 0.22 | 2.9 × 10$^5$ | 1,430 |
| 1 | 100 | 70 | na | na | 0.24 | 2.7 × 10$^5$ | 1,220 |
| 1 | 300 | 70 | na | na | 0.24 | 2.8 × 10$^5$ | 1,290 |
| 1 | 200 | 70 | 323k | 12.2 | 0.23 | 3.2 × 10$^5$ | 1,480 |

*B.D. = Bulk Density determined by ASTM 1895 method.

3. Polymerization of ethylene was conducted using method B of Example 6 described above except that the triisobutylaluminum (300 μmoles) was contained in 300 ml of heptane. The solution was then treated with a catalyst composition of a nickel (II) bidentate catalyst (10 μmole) [ArN=CH—CH=NAr]NiBr$_2$ where Ar represents 2,6-diisopropylphenyl and the SAB. Precursor Ion Pair D described above (see Table V) (120 mg; 23.6 μmole of boron). The heptane solution was introduced into the reactor at room temperature. Ethylene was then rapidly introduced to a pressure of 220 psig. Polymerization was conducted at RT and 220 psig for 40 minutes. The resultant polyethylene was filtered and dried in vacuum oven at 50° C. for 4 hours to yield 29 gm of polyethylene.

4. A series of polymerizations were conducted to polymerize ethylene using the catalyst compositions FTI-1, FTI-2 and FTI-3 formed in Example 5 above. Each polymerization was carried out for one hour in 300 ml heptane which contained 200 μmole of triisobutyl aluminum and 60 mg of the FTI catalyst composition indicated below. The conditions and results are given in Table VIII below.

TABLE VIII

| FTI # | Poly Method | P (psig) | MW | PDI | Temp (° C.) | Hexene (ml) | H$_2$/=C$_2$ | HLMI | B.D. (g/cc) | Cat Act. (g/g-Cat-h) |
|---|---|---|---|---|---|---|---|---|---|---|
| 1 | B | 200 | 283K | 10.5 | 70 | 0 | 0.07 | 3.71 | 0.33 | 3,000 |
| 1 | B | 200 | na | na | 70 | 0 | 0.015 | na | 0.34 | 2,100 |
| 1 | B | 200 | na | na | 70 | 0 | 0 | 1.52 | 0.33 | 2,600 |
| 1 | B | 200 | na | na | 70 | 20* | 0 | 3.36 | 0.35 | 1,900 |
| 2 | B | 200 | 328K | 9.0 | 65 | 0 | 0 | 1.09 | 0.36 | 2,300 |
| 2 | B | 200 | 328K | 8.8 | 70 | 0 | 0 | 1.42 | 0.34 | 2,400 |
| 2 | B | 200 | na | na | 80 | 0 | 0 | na | 0.32 | 2,100 |
| 2 | A | 150 | na | na | 60 | 20* | 0 | 2.08 | 0.37 | 1,000 |
| 3 | B | 200 | na | na | 70 | 0 | 0 | 1.06 | 0.36 | 2,500 |
| 3 | B | 200 | na | na | 65 | 30* | 0.064 | 8.39 | 0.30 | 3,840 |

*1-hexene was added to the Al$^i$Bu$_3$-containing heptane solution that contained a FTI-1 or -2 catalyst. The resulting solution was then injected to the reactor for polymerization.
HLMI = High Load Melt Index (g/10 min)
=C$_2$ represents ethylene The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing form the spirit of the invention.

What is claimed is:

1. A catalyst composition useful in the polymerization of olefins comprising

wherein

Cat represents a cationic remnant of a transition metal compound selected from the group consisting of transition metal/bidentate ligand compounds, transition metal/tridentate ligand compounds and mixtures thereof;

T represents an inorganic oxide;

Si represents a silicon atom;

R' and R" each independently represents hydrogen, an unsubstituted or a substituted C$_1$–C$_{20}$ hydrocarbyl group;

D represents an unsubstituted or a substituted C$_1$–C$_{20}$ hydrocarbylene group;

M represents an atom selected from the group consisting of boron, aluminum, gallium, indium, thallium and mixtures thereof;

each Q independently represents an unsubstituted or a substituted C$_1$–C$_{20}$ hydrocarbyl group;

O represents oxygen;

n and m are each a positive integer such that the product n times a is equal to the product of m times b; and a and b are integers of 1, 2 or 3.

2. The catalyst composition of claim 1 wherein Cat represents a cationic remnant of a transition metal/bidentate ligand compound represented by the formula:

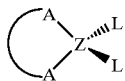
III wherein
  each A independently represents oxygen, nitrogen, phosphorous or sulfur;
  Z represents a Group IV or Group VIII transition metal of the Periodic Table of Elements;
  each L independently represents an anionic ligand group selected from the group consisting of hydrogen, halo, substituted hydrocarbyl and unsubstituted hydrocarbyl or both L together represent a hydrocarbylene group which, with Z, constitute a cyclic structure;
  the lines joining each A atom to each other represent a hydrocarbylene radical; and
  the lines between each A atom and Z represent a dative or covalent bond.

3. The catalyst of claim 2 wherein each A is nitrogen, each L is selected from the group consisting of unsubstituted hydrocarbyl group, hydrocarbyloxy group and a halogen atom or both L's together represent a hydrocarbylene group which together with Z forms a 3 to 7 membered ring structure.

4. The catalyst of claim 3 wherein Z is selected from the group consisting of Fe, Co, Ni, Ru, Rh, Pd, Os, Ir and Pt.

5. The catalyst of claim 4 wherein Z is selected from the group consisting of Ni, Pd, Fe and Co.

6. The catalyst of claim 4 wherein Z is selected from the group consisting of Fe and Co.

7. The catalyst of claim 4 wherein Z is selected from the group consisting of Ni and Pd.

8. The catalyst composition of claim 2 wherein each L represents a halogen atom and wherein said catalyst composition further comprises an aluminum compound represented by Al(R''')$_3$ wherein Al is an aluminum atom, and each R''' is independently selected from the group consisting of $C_1$–$C_{20}$ hydrocarbyl group and a $C_1$–$C_{20}$ hydrocarbyloxy group.

9. The catalyst composition of claim 3 wherein each L is independently selected from the group consisting of a $C_1$–$C_{20}$ unsubstituted hydrocarbyl, $C_1$–$C_{20}$ hydrocarbyloxy or both L groups bonded together represent an unsubstituted hydrocarbylene.

10. The catalyst composition of claims 1, 2 or 3 wherein M is boron, D is an arylene, fused arylene or polyarylene, each Q is perfluorohydrocarbyl and T is a silica macromolecule.

11. The catalyst composition of claim 4 wherein M is boron, D is an arylene, fused arylene or polyarylene, Q is perfluorohydrocarbyl and T is a silica macromolecule.

12. The catalyst composition of claim 5 wherein M is boron, D is an arylene, fused arylene or polyarylene, Q is perfluorohydrocarbyl and T is a silica macromolecule.

13. The catalyst composition of claim 6 wherein M is boron, D is an arylene, fused arylene or polyarylene, Q is a perfluorohydrocarbyl and T is a silica macromolecule.

14. The catalyst composition of claim 7 wherein M is boron, D is an arylene, fused arylene or polyarylene, Q is a perfluorohydrocarbyl and T is a silica macromolecule.

15. The catalyst composition of claim 8 wherein M is boron, D is an arylene, fused arylene or polyarylene, Q is a perfluorohydrocarbyl and T is a silica macromolecule.

16. The catalyst composition of claim 9 wherein M is boron, D is an arylene, fused arylene or polyarylene, Q is a perfluorohydrocarbyl and T is a silica macromolecule.

17. The catalyst composition of claim 1 wherein Cat represents a cationic remnant of a transition metal/tridentate ligand compound represented by the formula

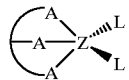
IV wherein
  each A independently represents oxygen, nitrogen, phosphorous or sulfur;
  Z represents a Group IV or Group VIII transition metal of the Periodic Table of Elements;
  each L independently represents an anionic ligand group selected from the group consisting of hydrogen, halo, substituted hydrocarbyl and unsubstituted hydrocarbyl or both L together represent a hydrocarbylene group which, with Z, constitute a cyclic ring structure;
  the lines joining each A atom to each other A represent a hydrocarbylene radical; and
  the lines joining each A atom to Z represent a dative or covalent bond.

18. The catalyst of claim 17 wherein each A is a nitrogen atom, each L is selected from the group consisting of unsubstituted hydrocarbyl group, hydrocarbyloxy group, a halogen atom and mixtures thereof or both L together represent a hydrocarbylene group which together with Z forms a 3 to 7 membered ring structure.

19. The catalyst of claim 18 wherein Z is selected from the group consisting of Fe, Co, Ni, Ru, Rh, Pd, Os, Ir, Pt, Ti, Zr and Hf.

20. The catalyst of claim 19 wherein Z is selected from the group consisting of Ni, Pd, Fe and Co.

21. The catalyst of claim 19 wherein Z is selected from the group consisting of Fe and Co.

22. The catalyst of claim 19 wherein Z is selected from the group consisting of Ni and Pd.

23. The catalyst composition of claim 17 wherein each L represents a halogen atom and wherein said catalyst composition further comprises an aluminum compound represented by Al(R''')$_3$ wherein Al is an aluminum atom, and each R''' is independently selected from the group consisting of substituted and unsubstituted $C_1$–$C_{20}$ hydrocarbyl group.

24. The catalyst composition of claim 17 or 18 wherein each L is independently selected from the group consisting of a $C_1$–$C_{20}$ unsubstituted hydrocarbyl, and a $C_1$–$C_{20}$ hydrocarbyloxy group or both L groups bonded together represent a hydrocarbylene group.

25. The catalyst composition of claim 17 wherein M is boron, D is arylene, fused arylene or polyarylene, each Q is a perfluorohydrocarbyl and T is a silica macromolecule.

26. The catalyst composition of claim 18 wherein M is boron, D is an arylene, fused arylene or polyarylene, Q is a perfluorohydrocarbyl and T is a silica macromolecule.

27. The catalyst composition of claim 19 wherein M is boron, D is an arylene, fused arylene or polyarylene, Q is a perfluorohydrocarbyl and T is a silica macromolecule.

28. The catalyst composition of claim 20 wherein M is boron, D is an arylene, fused arylene or polyarylene, Q is a perfluorohydrocarbyl and T is a silica macromolecule.

29. The catalyst composition of claim 21 wherein M is boron, D is an arylene, fused arylene or polyarylene, Q is a perfluorohydrocarbyl and T is a silica macromolecule.

30. The catalyst composition of claim 22 wherein M is boron, D is an arylene, fused arylene or polyarylene, Q is a perfluorohydrocarbyl and T is a silica macromolecule.

31. The catalyst composition of claim 23 wherein M is boron, D is an arylene, fused arylene or polyarylene, Q is a perfluorohydrocarbyl and T is a silica macromolecule.

32. The catalyst composition of claim 24 wherein M is boron, D is an arylene, fused arylene or polyarylene, Q is a perfluorohydrocarbyl and T is a silica macromolecule.

33. A composition capable of providing an activated olefin polymerization catalyst formed by contacting a) a transition metal/bidentate ligand compound represented by the formula

III wherein
each A independently represents oxygen, nitrogen, phosphorous or sulfur;
Z represents a Group IV or Group VIII transition metal of the Periodic Table of Elements;
each L independently represents an anionic ligand group selected from the group consisting of hydrogen, halo, substituted hydrocarbyl and unsubstituted hydrocarbyl or both L together represent a hydrocarbylene group which, with Z, constitute a cyclic ring structure;
the line joining each A atom to each other represents a hydrocarbylene radical; and
the lines joining each A atom to Z represent a dative or covalent bond; with b) a Precursor Ion Pair comprising a metalloid silane modified inorganic oxide salt represented by the formula

wherein
Ct represents at least one cationic remnant of a BrØnsted acid salt, an oxidizing cation, a carbonium ion or a silylium ion;
T represents an inorganic oxide;
Si represents a silicon atom;
R' and R" each independently represents hydrogen, an unsubstituted or a substituted $C_1$-$C_{20}$ hydrocarbyl;
D represents a substituted or unsubstituted $C_1$-$C_{20}$ hydrocarbylene;
M represents an atom selected from the group consisting of boron, aluminum, gallium, indium thallium and mixtures thereof;
Q each independently represents an unsubstituted or a substituted $C_1$-$C_{20}$ hydrocarbyl group;
O represents oxygen;
n and m are each a positive integer such that the product n times a is equal to the product of m times b; and
a and b are integers of 1, 2 or 3.

34. The catalyst of claim 33 wherein at least one A is nitrogen and the remaining A nitrogen a oxygen.

35. The catalyst of claim 34 wherein Z is selected from the group consisting of Fe, Co, Ni, Ru, Rh, Pd, Os, Ir, Pt, Ti, Zr and Hf.

36. The composition of claim 35 wherein Z is selected from the group consisting of Ni, Pd, Fe and Co.

37. The composition of claim 35 wherein Z is selected from the group consisting of Fe and Co.

38. The composition of claim 35 wherein Z is selected from the group consisting of Ni and Pd.

39. The composition of claims 33, 34, 35, 36, 37 or 38 wherein M is boron, D is an arylene, fused arylene or polyarylene, each Q is a perfluorohydrocarbyl and T is a silica macromolecule.

40. The composition of claims 33, 34, 35 or 37 wherein T represents a silica macromolecule.

41. The composition of claim 33 wherein M is boron, D is an arylene, fused arylene or polyarylene, each Q is a perfluorohydrocarbyl and T is a silica macromolecule and at least one L represents a halogen atom.

42. The composition of claim 34 wherein M is boron, D is an arylene, fused arylene or polyarylene, each Q is a perfluorohydrocarbyl and T is a silica macromolecule and at least one L represents a halogen atom.

43. The composition of claim 37 wherein M is boron, D is an arylene, fused arylene or polyarylene, each Q is a perfluorohydrocarbyl and T is a silica macromolecule and at least one L represents a halogen atom.

44. The composition of claim 33 wherein at least one L represents a halogen atom.

45. The composition of claim 34 wherein at least one L represents a halogen atom.

46. The composition of claim 37 wherein at least one L represents a halogen atom.

47. The composition of claim 33 wherein each L represents an unsubstituted hydrocarbyl, a hydrocarbyloxy group or both together represent a hydrocarbylene group.

48. The composition of claim 34 wherein each L represents an unsubstituted hydrocarbyl, a hydrocarbyloxy group or both together represent a hydrocarbylene group.

49. The composition of claim 37 wherein each L represents an unsubstituted hydrocarbyl, a hydrocarbyloxy group or both together represent a hydrocarbylene group.

50. The composition of claim 33 wherein each L represents an unsubstituted hydrocarbyl, a hydrocarbyloxy group or both together represent a hydrocarbylene group.

51. The composition of claim 34 wherein each L represents an unsubstituted hydrocarbyl, a hydrocarbyloxy group or together a hydrocarbylene group.

52. The composition of claim 37 wherein each L represents an unsubstituted hydrocarbyl, a hydrocarbyloxy group or both together represent a hydrocarbylene group.

53. A composition capable of being activated to an olefin polymerization catalyst formed by contacting a mixture of a) a transition metal/tridentate ligand compound represented by the formula

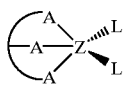
IV wherein
A each independently represents an atom of oxygen, phosphorous, nitrogen or sulfur;
Z represents a Group IV or Group VIII element of the Periodic Table of Elements;
each L independently represents an anionic ligand group selected from the group consisting of hydrogen, halo, and substituted or unsubstituted hydrocarbyl or both L together represent a hydrocarbylene group which, with Z, constitute a cyclic ring structure;

the lines joining each A atom to each other represents a hydrocarbylene radical; and the lines joining each A atom to Z represent a dative or covalent bond; with b) a Precursor Ion Pair comprising a metalloid silane modified inorganic oxide salt represented by the formula

wherein

Ct represents a cationic remnant of a BrØnsted acid salt, an oxidizing cation, a carbonium ion or a silylium ion;

T represents an inorganic oxide;

Si represents a silicon atom;

R' and R" each independently represents hydrogen, an unsubstituted or a substituted $C_1$–$C_{20}$ hydrocarbyl;

D represents an unsubstituted or a substituted $C_1$–$C_{20}$ hydrocarbylene;

M represents an atom selected from the group consisting of boron, aluminum, gallium, indium, thallium and mixtures thereof;

Q each independently represents an unsubstituted or a substituted $C_1$–$C_{20}$ hydrocarbyl group;

O represents oxygen;

n and m are each a positive integer such that the product n times a is equal to the product of m times b; and a and b are integers of 1, 2 or 3.

54. The catalyst of claim 53 wherein at least one A is nitrogen atom and the remaining A is nitrogen a oxygen.

55. The catalyst of claim 54 wherein Z is selected from the group consisting of Fe, Co, Ni, Ru, Rh, Pd, Os, Ir and Pt.

56. The catalyst of claim 55 wherein Z is selected from the group consisting of Ni, Pd, Fe and Co.

57. The catalyst of claim 55 wherein Z is selected from the group consisting of Fe and Co.

58. The catalyst of claim 55 wherein Z is selected from the group consisting of Ni and Pd.

59. The catalyst composition of claims 53, 54, 55, 56, 57 or 58 wherein M is boron, D is an arylene, fused arylene or polyarylene, Q is a perfluorohydrocarbyl and T is a silica macromolecule.

60. The composition of claims 53, 54, 55 or 56 wherein T represents a silica macromolecule.

61. The composition of claim 53 wherein M is boron, D is an arylene, fused arylene or polyarylene, each Q is a perfluorohydrocarbyl and T is a silica macromolecule and at least one L represents a halogen atom.

62. The composition of claim 54 wherein M is boron, D is an arylene, fused arylene or polyarylene, each Q is a perfluorohydrocarbyl and T is a silica macromolecule and at least one L represents a halogen atom.

63. The composition of claim 57 wherein M is boron, D is an arylene, fused arylene or polyarylene, each Q is a perfluorohydrocarbyl and T is a silica macromolecule and at least one L represents a halogen atom.

64. The composition of claim 53 wherein at least one L represents a halogen atom.

65. The composition of claim 54 wherein at least one L represents a halogen atom.

66. The composition of claim 57 wherein at least one L represents a halogen atom.

67. The composition of claim 53 wherein each L represents a hydrocarbyl, a hydrocarbyloxy group or both together represent a hydrocarbylene group.

68. The composition of claim 54 wherein each L represents a hydrocarbyl, a hydrocarbyloxy group or both together represent a hydrocarbylene group.

69. The composition of claim 57 wherein each L represents a hydrocarbyl, a hydrocarbyloxy group or both together represent a hydrocarbylene group.

70. The composition of claim 53 wherein each L represents a hydrocarbyl, a hydrocarbyloxy group or both together represent a hydrocarbylene group.

71. The composition of claim 54 wherein each L represents a hydrocarbyl, a hydrocarbyloxy group or both together represent a hydrocarbylene group.

72. The composition of claim 57 wherein each L represents a hydrocarbyl, a hydrocarbyloxy group or both together represent a hydrocarbylene group.

* * * * *